(12) United States Patent
Newhard et al.

(10) Patent No.: US 8,875,072 B2
(45) Date of Patent: Oct. 28, 2014

(54) ADAPTIVE TEMPLATE SYSTEM FOR AN AUTOMATED PCB MANUFACTURING RELEASE PACKAGE SYSTEM

(71) Applicant: DownStream Technologies, LLC, Marlborough, MA (US)

(72) Inventors: William F. Newhard, Westford, MA (US); Roman Lototskyy, Boxborough, MA (US)

(73) Assignee: DownStream Technologies, LLC, Marlborough, MA (US)

( * ) Notice: Subject to any disclaimer, the term of this patent is extended or adjusted under 35 U.S.C. 154(b) by 0 days.

(21) Appl. No.: 13/654,961

(22) Filed: Oct. 18, 2012

(65) Prior Publication Data
US 2014/0114617 A1    Apr. 24, 2014

(51) Int. Cl.
*G06F 17/50* (2006.01)

(52) U.S. Cl.
CPC ........ *G06F 17/5068* (2013.01); *G06F 2217/74* (2013.01)
USPC .......................................... 716/104; 716/101

(58) Field of Classification Search
USPC .................................................. 716/101, 104
See application file for complete search history.

(56) References Cited

U.S. PATENT DOCUMENTS 7,409,666 B2 * 8/2008 Almeida et al. ............... 716/137

* cited by examiner

*Primary Examiner* — Thuan Do
(74) *Attorney, Agent, or Firm* — Iandiorio Teska & Coleman, LLP

(57) ABSTRACT

An adaptive template system for an automated PCB manufacturing release package system includes a PCB database including PCB CAD data associated with a CAD file of PCB design. A shape engine is configured to read the PCB CAD data and display simultaneous views of a given PCB from the PCB database including different views of the PCB and configured to create reconfigurable objects displayed simultaneously in the form of different views of the PCB such that any change in the design of the PCB is reflected in the different views. One or more selectable adaptive templates, and an adaptive template object in the shape engine are configured to: read a selected adaptive template, generate a view of the adaptive template which provides for input of user-entered data, and retain the user-entered data in the adaptive template.

22 Claims, 38 Drawing Sheets

Drill Chart

| Qty | Size | Sym | Plated | Tolerance | Remarks |
|---|---|---|---|---|---|
| 1 | 0.3048 | A | Yes | +/-0.3048 | ⌀.005 A B⊕ C⊕ |
| 2 | 0.3048 | B | Yes | +/-0.3048 | ⌀.005 A B⊕ C⊕ |
| 23 | 0.3810 | C | Yes | +/-0.3810 | |
| 80 | 0.8890 | D | Yes | +/-0.0762 | ⌀.005 A B⊕ C⊕ |
| 1 | 0.9398 | I | Yes | +/-0.9398 | ⌀.005 A B⊕ C⊕ |
| 12 | 0.9398 | H | Yes | +/-0.9398 | ⌀.005 A B⊕ C⊕ |
| 13 | 0.9398 | F | Yes | +/-0.9398 | TENTED VIAS |
| 146 | 0.9398 | J | Yes | +/-0.9398 | ⌀.005 A B⊕ C⊕ |
| 193 | 0.9398 | E | Yes | +/-0.0762 | ⌀.005 A B⊕ C⊕ |
| 571 | 0.9398 | G | Yes | +/-0.0762 | ⌀.005 A B⊕ C⊕ |
| 9 | 1.0414 | K | Yes | +/-0.0762 | 1 |
| 3 | 2.5400 | L | Yes | +/-0.0762 | Spec IPC-2222 NA |
| 6 | 3.0480 | M | Yes | +/-0.0762 | |
| 3 | 3.8100 | N | Yes | +/-0.0762 | ⌀.005 A B⊕ C⊕ |

Adaptive Table Template UML Class Diagram

ADAPTIVE TEMPLATE SYSTEM FOR AN AUTOMATED PCB MANUFACTURING RELEASE PACKAGE SYSTEM

FIELD OF THE INVENTION

This invention relates to an adaptive template system for an automated PCB manufacturing release package system.

BACKGROUND OF THE INVENTION

A manufacturing documentation release package of a PCB typically includes, inter alma, drawings with title blocks, revision blocks, note blocks, different board views, board parts lists or components and their placement, callouts for the various parts, drill patterns, drill charts, layer stacking, and the like. The various drawings of the manufacturing documentation release package may include various board views with part reference designators, a parts list (e.g., a bill of materials) cross linked to the reference designators, note blocks for detailed assembly instructions, and callouts for detailed notes of the assembly of specific parts.

Conventional methods and systems for generating a manufacturing documentation release package for PCBs typically utilize CAD programs that are not specifically designed for creating the documentation needed for the release package. These conventional techniques typically rely on CAD programs wherein various views of the PCB circuit board are translated between CAD programs to create multiple static images of the various PCB views. The various details of documentation for the fabrication and assembly of the PCB are then often manually entered on the translated image. This process typically requires a separately copied design for each view of the PCB board which must be separately documented. A skilled PCB engineer must ensure the accuracy of the documentation release package and therefore the process of creating a single manufacturing documentation release package can take weeks to complete.

Moreover, any design changes to the PCB board mandates that the entire process be repeated (e.g., re-creating each separate image) and the supporting documentation manually re-entered because there is no link between the static images and the PCB database. The static images have no structured hierarchy for the selection and annotation of the documentation. The PCB views, chart, notes, and the like, of these images cannot be re-positioned within the document. Prior systems and methods for creating manufacturing documentation also have no modern document authoring functionality and do not provide electronic file sharing or internet access. Moreover, the final release package is typically prepared in paper format or delivered via a PDF® file format. Finally, existing CAD systems are clearly not designed for providing documentation to create a complete manufacturing documentation release package. Prior art CAD programs such as AUTOCAD®, and the like, are cumbersome and difficult to use.

U.S. Pat. No. 7,409,666 ("the '666 patent") by one or more of the inventors hereof and the assignee hereof, incorporated by reference herein, overcomes the problems of the conventional methods and systems for generating a manufacturing documentation release package for PCBs. As disclosed therein, an automated PCB manufacturing documentation release package system includes a PCB database with PCB CAD data associated with a CAD file of a PCB design. A shape engine displays simultaneous views of a given PCB from the PCB database that includes different views of the PCB and retrieves the data in the PCB database to create reconfigurable objects displayable simultaneously in the forms of different views of the PCB such that any change in the design of the PCB is reflected in the different views.

The '666 patent teaches templates which can be customized by a user to define how the PCB database is represented in a particular view. However, the templates as disclosed in the '666 patent do not provide any way for data entered by the user into the template to be retained. Thus, when the design of a PCB changes and a new PCB CAD file reflecting the changes is loaded into the PCB database, the user-entered data in any templates is lost and must be re-entered. Such a process is time consuming and expensive.

SUMMARY OF THE INVENTION

In one aspect, an adaptive template system for an automated PCB manufacturing release package system is featured. The system includes a PCB database including PCB CAD data associated with a CAD file of PCB design. A shape engine is configured to read the PCB CAD data and display simultaneous views of a given PCB from the PCB database including different views of the PCB and configured to create reconfigurable objects displayed simultaneously in the form of different views of the PCB such that any change in the design of the PCB is reflected in the different views. The system also includes one or more selectable adaptive templates and an adaptive template object in the shape engine configured to read a selected adaptive template, generate a view of the adaptive template which provides for input of user-entered data, and retain the user-entered data in the adaptive template.

In one embodiment, the adaptive template object may be further configured such that any change in the design of a PCB is reflected in a view of the adaptive template with the user-entered data and a manufacturing documentation release package. The one or more selectable adaptive templates may include a drill chart adaptive template. The one or more selectable adaptive templates may include a parts list adaptive template. The one or more selectable adaptive templates may include a component coordinate chart adaptive template. The one or more selectable adaptive templates may include a generic table template linked to a data table in the PCB database. The one or more adaptive templates may include a user-defined table adaptive template. The one or more adaptive templates may include a layer table adaptive template. The one or more adaptive templates may include a nets table adaptive template. The one or more adaptive templates may include a process step chart adaptive template. The user-entered data may include adding or modifying text in the one or more adaptive templates. The user-entered data may include adding or modifying a drawing element in the one or more adaptive templates. The user-entered data may include inserting or modifying references to the notes, parts list items, document variables and/or details in the one or more adaptive templates. The user-entered data may include adding a row in the one or more adaptive templates. The row may be added to the top of a table, the bottom of a table, or the middle of a table. The user-entered data may include resizing the height of a row. The user-entered data may include deleting one or more rows in the one or more adaptive templates. The adaptive template object may be further configured to populate the selected adaptive template with PCB data enumerated using a composite key. The composite key may include a set of user selectable common attributes.

In another aspect, an adaptive template for an automated PCB manufacturing release package system is featured. The system includes a PCB database including PCB CAD data associated with a CAD file of PCB design. A shape engine is configured to read the PCB CAD data and display simultaneous views of a given PCB from the PCB database including different views of the PCB and configured to create reconfigurable objects displayed simultaneously in the form of different views of the PCB such that any change in the design of the PCB is reflected in the different views. The system also includes one or more selectable adaptive templates and an adaptive template object in the shape engine. The adaptive template object is configured to read a selected adaptive template, generate a view of the adaptive template which provides for input of user entered-data, and retain the user-entered data in the adaptive template such that any change in the design of a PCB is reflected in a view of the adaptive template with retained user-entered data.

BRIEF DESCRIPTION OF THE SEVERAL VIEWS OF THE DRAWINGS

Other objects, features and advantages will occur to those skilled in the art from the following description of a preferred embodiment and the accompanying drawings, in which:

FIG. 5 shows an example of a user adding data directly to a populated drill chart adaptive template;

FIG. 18 is a view showing an example of a user saving a parts list adaptive template shown in FIG. 14 to the element gallery;

FIGS. 34-36 show an example of a composite key for a parts list adaptive template in accordance with one embodiment of this invention;

DETAILED DESCRIPTION OF THE INVENTION

Figure 1:
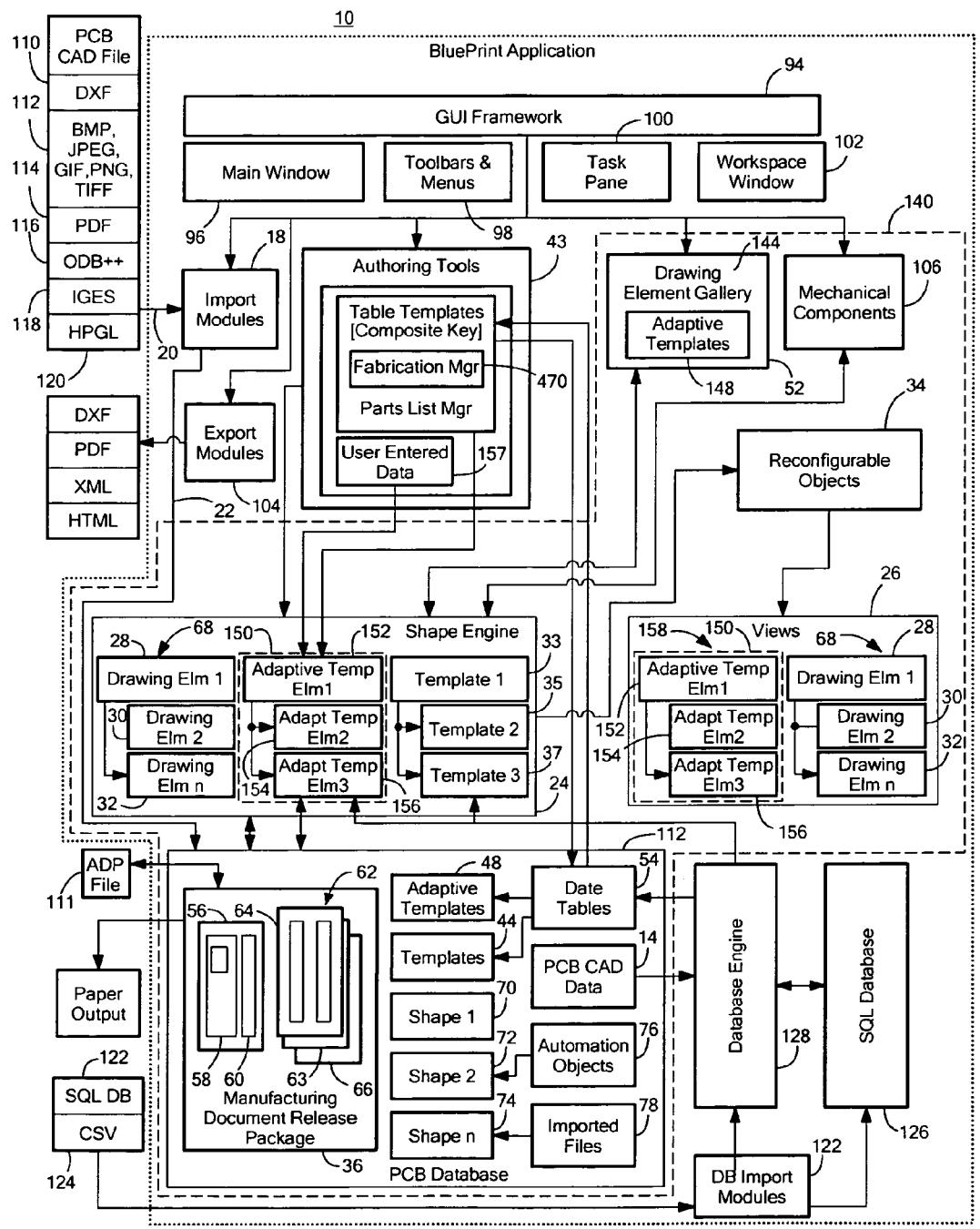
FIG. 1 is a schematic block diagram of one embodiment of the adaptive template system for an automated PCB manufacturing release package of this invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Adaptive template system 140, FIG. 1, of one embodiment of this invention, for an automated PCB manufacturing release package system includes PCB database 12 having PCB CAD data 14 associated with PCB CAD file 16 of a PCB design. Adaptive template system 140 also includes shape engine 24 configured to read PCB CAD data 14 and display simultaneous views 26 of a given PCB design that includes different views of the PCB of the PCB design in PCB CAD data 14 and generate reconfigurable objects 34 from PCB database 12 that are simultaneously displayed in views 26 such that any change in the design of the PCB is reflected in views 26. In this example, adaptive template system 140 is used with automated PCB manufacturing release package system 10, which is preferably similar to the automated PCB manufacturing release package system disclosed in the '666 patent cited supra and incorporated by reference herein.

In this particular example, automated PCB manufacturing release package system 10 utilizes PCB CAD data 14, discussed above, that preferably includes all the relevant CAD data in PCB CAD file 16 of a PCB design created and stored in PCB database 12 by importing PCB CAD file 16 with import modules, such as import modules 18, e.g., as shown by arrows 20 and 22. In other examples, import modules 18 may import a variety of files that contain CAD data in various other formats, such as DXF file 110, graphic file 112 (e.g., BMP, JPEG, GIF, PNG, or TIFF graphic files), PDF® file 114, ODB++® file 116, IGES file 118, or HPGL file 120 into PCB database 12. Shape engine 24 reads PCB CAD data 14 and displays simultaneous views 26 of a given PCB design that includes different views of the PCB, e.g., drawing elements 28, 30, and 32 of the PCB design in PCB CAD data 14. Shape engine 24 also generates reconfigurable objects 34 from PCB database 12 that are simultaneously displayed in views 26 such that any change in the design of the PCB is reflected in views 26. System 10 is designed such that any change in the design of the PCB is automatically reflected in the drawing element in views 26 and manufacturing documentation release package 36 by re-loading a new PCB CAD file 16 into PCB database 12 and linking PCB database 12 to views 26.

Authoring tools module 43 preferably interfaces with shape engine 24 to provide for interactively adding or modifying the various drawing elements implemented as reconfigurable objects 34 to create manufacturing documentation release package 36 as disclosed in the '666 patent.

Shape engine 24 is typically configured to read PCB database 12 and generate a hierarchy of objects, e.g., drawing elements 28-32, in the hierarchy indicated by arrow 68, that include methods, e.g., subroutines, that interface with authoring tools module 43 to generate reconfigurable objects 34, to which the manufacturing documentation is added and simultaneously displayed in views 26. PCB database 12 typically includes shape data, e.g., shape data 70, shape data 72, and shape data 74, of the various drawing elements discussed above, e.g., shape data for drawing elements 28-32. PCB database 12 may also include data tables 54, automation objects 76 and imported files 78. Additional details of the operation of shape engine 24 displaying simultaneous views of a given PCB from the PCB database including different views of the PCB and configured to create reconfigurable objects displayed simultaneously in the form of different views of the PCB such that any change in the design of the PCB is reflected in the different views are disclosed in '666 patent.

System 10 also preferably includes GUI 94 with main window 96, toolbars and menus 98, tasks pane 100, and workspace window 102 that provide a graphic interface with import modules 18, export module 104, authoring tools module 43, drawing element gallery 52 and mechanical components 106. Mechanical components 106 may be used to create user-defined parameters for selected mechanical components of a PCB, e.g., a mechanical part on the PCB with a particular user-defined dimension. Similarly, shape engine 24 stores the user-defined mechanical component in PCB database 12.

System 10 preferably includes one or more templates. Templates are preferably defined and managed in three places: 1) as templates 44 in PCB database 12 where information can be stored in APD file 111 loaded and used in system 10, 2) as templates 144 in element gallery 52 where information is stored for reuse across multiple APD 111 files, and 3) as template elements 33, 35, and 37 in the shape engine 24 where template information, PCB CAD data 14, and data table 54 information is brought together to create views on sheets of manufacturing document release package 36. As disclosed in the '666 patent, manufacturing documentation release package 36 typically includes at least one drawing 56 that includes one or more drawing sheets, e.g., drawing sheets 58 and 60 such as fabrication and assembly drawings, and the like, to which the manufacturing documentation is created and modified using the various drawing elements, e.g., one or more drawing elements 28, 30, and/or 32. In practice, manufacturing documentation release package 36 typically includes a plurality of drawings 62 that each includes a plurality of drawing sheets, e.g., drawing sheets 64, 65, and 66. A template is an object/shape that includes template elements, e.g., template elements 33, 35, and 37 which may be stored in PCB database 12. As disclosed in the '666 patent, template elements 33-37 can be customized by a user to define how the data in PCB database 12 (e.g., data tables 54 or PCB CAD data 14) is represented within particular drawing elements. Template elements are used to specify the "look" of a particular drawing element. That is, how the data in PCB database 12 is represented within the drawing element. The template elements do not actually contain the data, only how the data will be represented in the various drawing elements. Many of the drawing elements discussed above may be created from template elements and are often referred to as template-based drawing elements.

Authoring tools module 43 interfaces with shape engine 24 to provide for interactively creating and modifying template elements 33-37. The result is that a user can create and modify a template element for virtually any type of drawing element. Shape engine 24 stores the user-defined drawing elements and template elements as disclosed above in templates 44 in PCB database 12. The saved template based drawing element can then be re-used when needed. Template elements 33-37 are typically linked to data tables 54. Data tables 54 provide an interface to all data contained in the imported PCB design, e.g., PCB CAD data 14. Data tables 54 are similar to a data table in a relational database. It is comprised of data rows (records) and data columns (fields). Columns define the field values that the data table stores. Rows contain actual data values for the given set of columns. The intersection of a column and a row is a data field that contains a value. A template-based drawing element is created from its template by an execute operation that connects the actual data source, e.g., data tables 54 or PCB CAD data 14, to the template-based drawing element using database engine 128. The template based drawing element is then populated with the appropriate PCB data. Database engine 128, shape engine 24 and authoring tools module 43 allow the user to modify the predefined table as well as create and link user-defined tables to PCB database 12 and external files.

Although the '666 patent teaches templates that may provide for user-entered data, the '666 patent fails to teach or disclose a way in which user-entered data into a template can be retained if new PCB CAD data 14 is loaded into the system. Thus, when the design of a PCB changes, e.g., with an engineering change order, and a new PCB CAD file 16 reflecting the changes is loaded into PCB CAD data 14 and PCB database 12, the user-entered data into the template is lost. Thus, the user must re-enter the data into the template and then re-load the PCB data again. Such a process is time consuming, cumbersome, and expensive.

Adaptive template system 140, FIG. 1, for an automated PCB manufacturing release package system of one or more embodiments of this invention provides a solution to the aforementioned problems associated with the '666 patent. As discussed above, adaptive template system 140 includes PCB database 12 having PCB CAD data 14 associated with PCB CAD file 16 of a PCB design and shape engine 24 configured to read PCB CAD data 14 and display simultaneous views 26 of a given PCB design that includes different views of the PCB of the PCB design in PCB CAD data 14 and generate reconfigurable objects 34 from PCB database 12 that are simultaneously displayed in views 26 such that any change in the design of the PCB is reflected in views 26.

Adaptive template system 140 also includes one or more adaptive templates. Similar to templates 44 and 144 and template elements 33-37 discussed above, the adaptive templates of one or more embodiments of this invention may be stored as adaptive templates 148 in drawing elements gallery 52 or as adaptive templates 48 in PCB database 12. Each adaptive template in adaptive templates 48, 148 is a kind of template similar to templates 44, 144 discussed above, except they provide for the both input and retention of user-entered data.

Adaptive template system 140 also includes at least one adaptive template object 150 in shape engine 24. In this example, adaptive template object 150 preferably includes instances adaptive template element 152, adaptive template element 154, and adaptive template element 156 as shown. Adaptive template object 150 is configured to read a user-selected adaptive template from adaptive templates 48 and/or adaptive template 148 and generate views 158 in views 26 of the selected adaptive templates which provides for the input and retention of user-entered data. The user-entered data may be stored in adaptive templates 48 in PCB data base 12 or in adaptive templates 148 in elements gallery 52, as discussed in further detail below.

The result is adaptive template system 140 of one or more embodiments of this invention for an automated PCB manufacturing release package system provides for the input and retention of user-entered data in the adaptive template. Adaptive template system 140 eliminates the need for the user to re-enter user-entered data into an adaptive template when there is change in the design of a PCB. Thus, a new PCB CAD file 16 reflecting any design changes can be loaded into PCB CAD data 14 in PCB CAD database. In one example, PCB CAD data 14 can be imported 18 and the previously saved manufacturing documentation release package 36 may be linked by shape engine 24 to the PCB CAD data 14 and data tables 54 in PCB database 12. All the changes in the PCB design are automatically shown in the view the adaptive template with the previously entered user-entered data. Thus, there is no need for the user to re-enter user data which significantly saves time and money.

Figure 2:
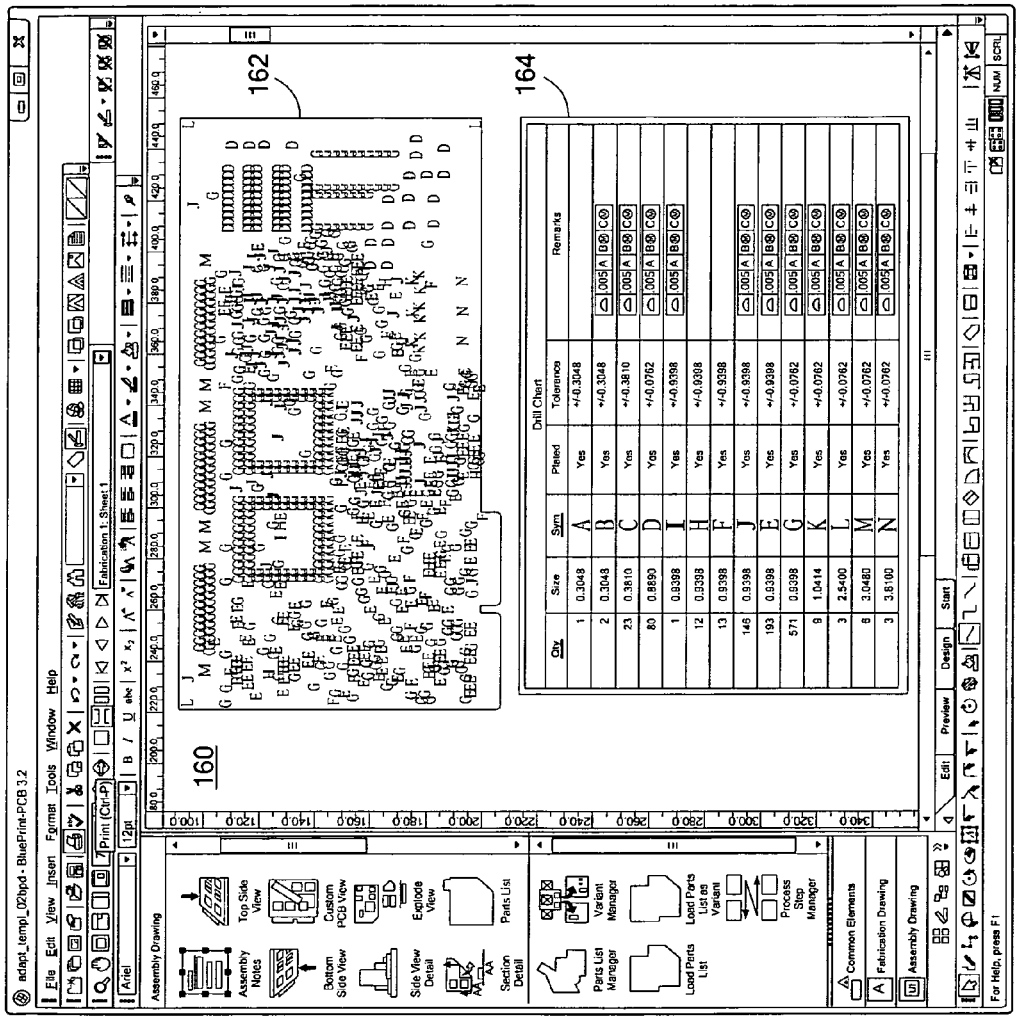
FIG. 2 is a view showing an example of an exemplary drill pattern and corresponding drill chart template.
Figure 3:
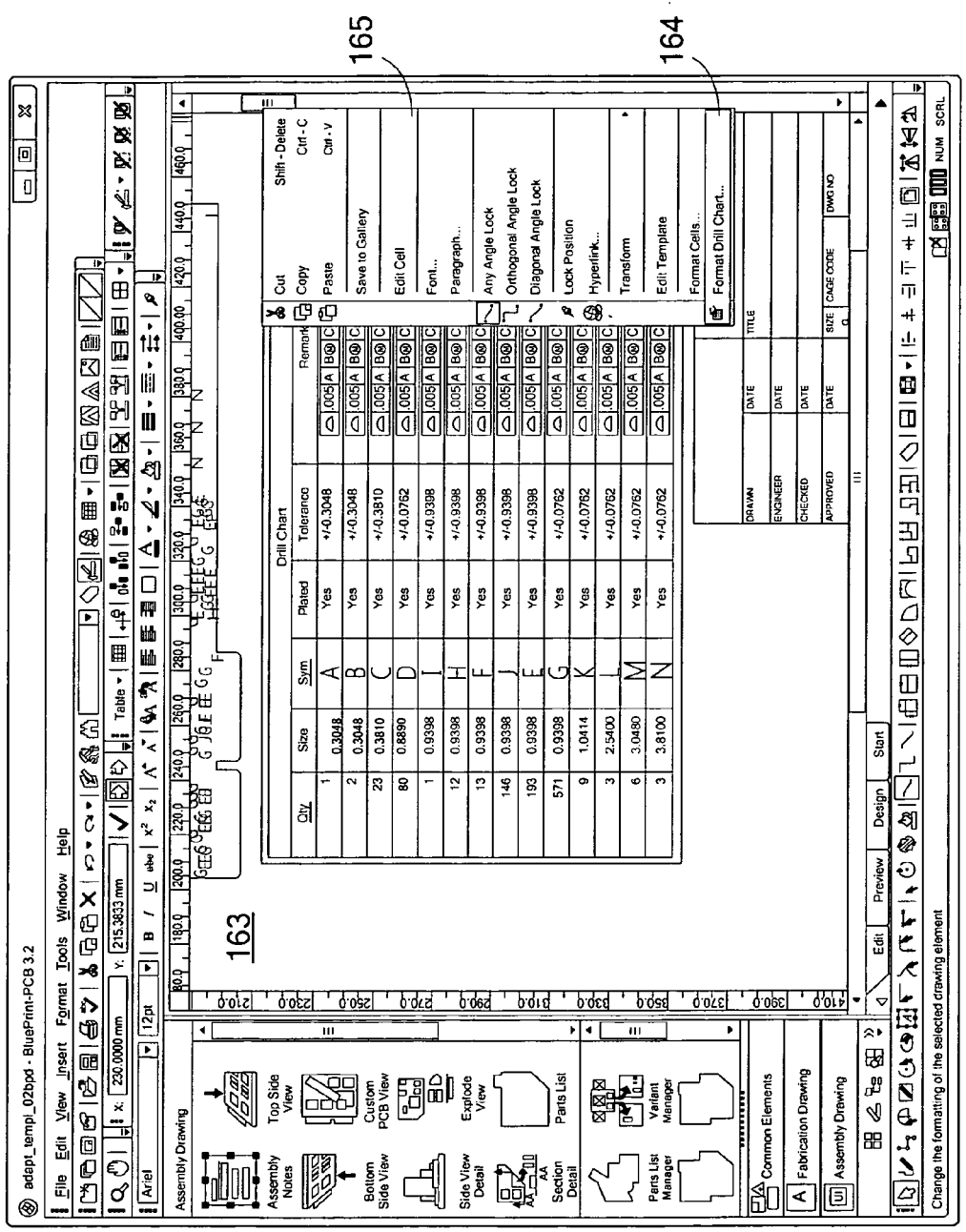
FIGS. 3 and 4 show views of one example of initiating the adaptive template system of one embodiment of this invention for a drill chart adaptive template.
Figure 4:
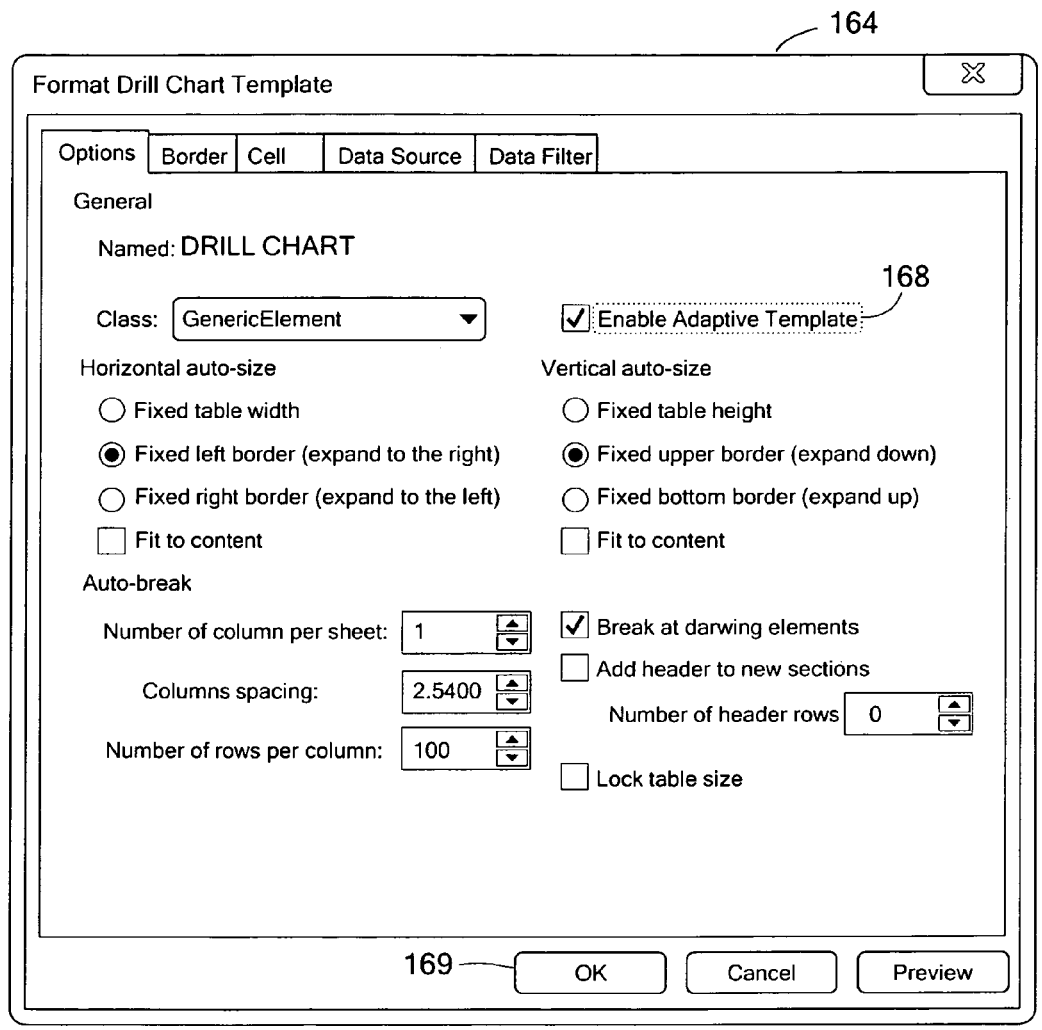
Figure 6:
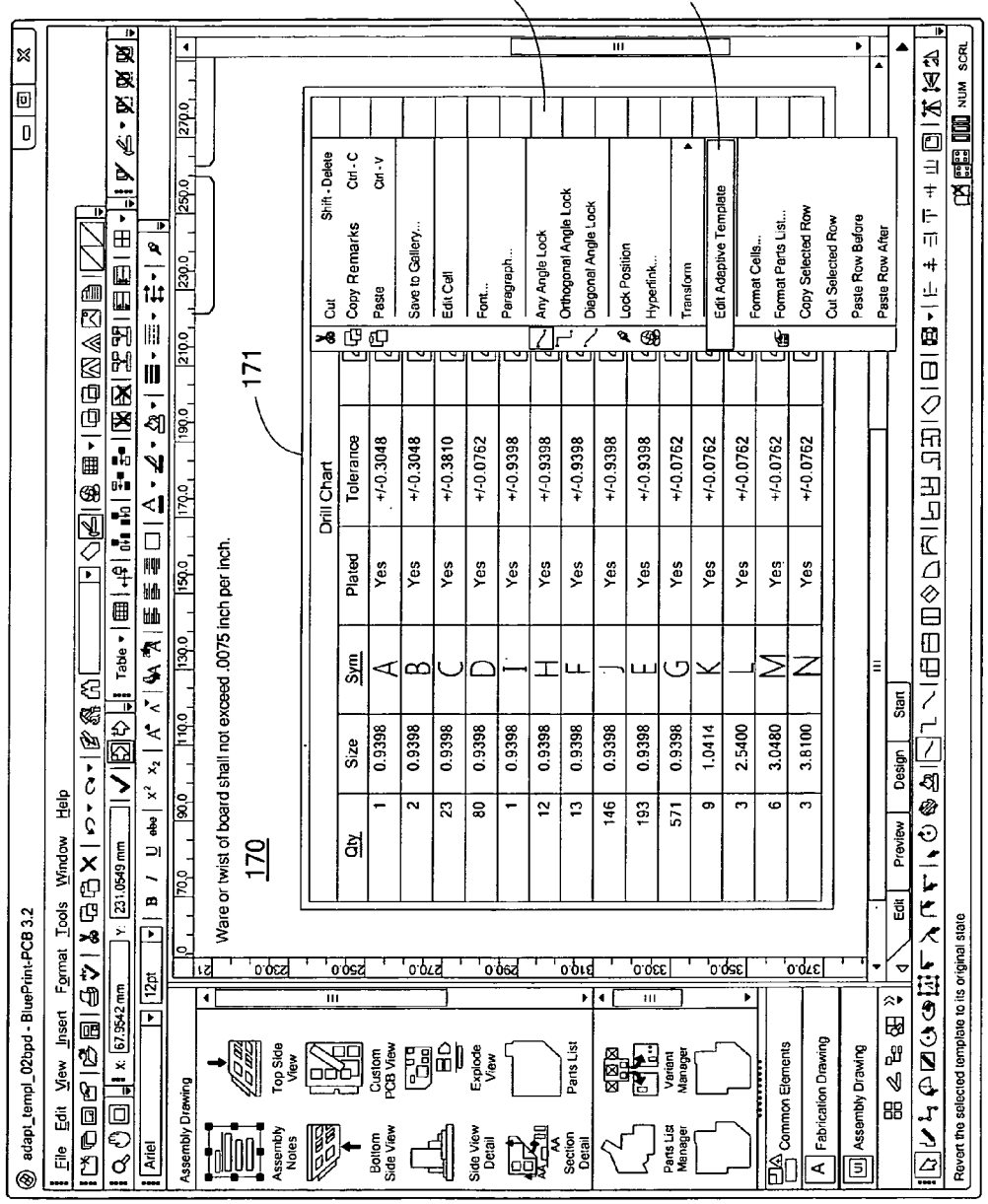
FIG. 6 is a view showing a user selecting the edit adaptive template mode to modify the drill chart adaptive template and/or add or modify user data in accordance with one embodiment of this invention.
Figure 7:
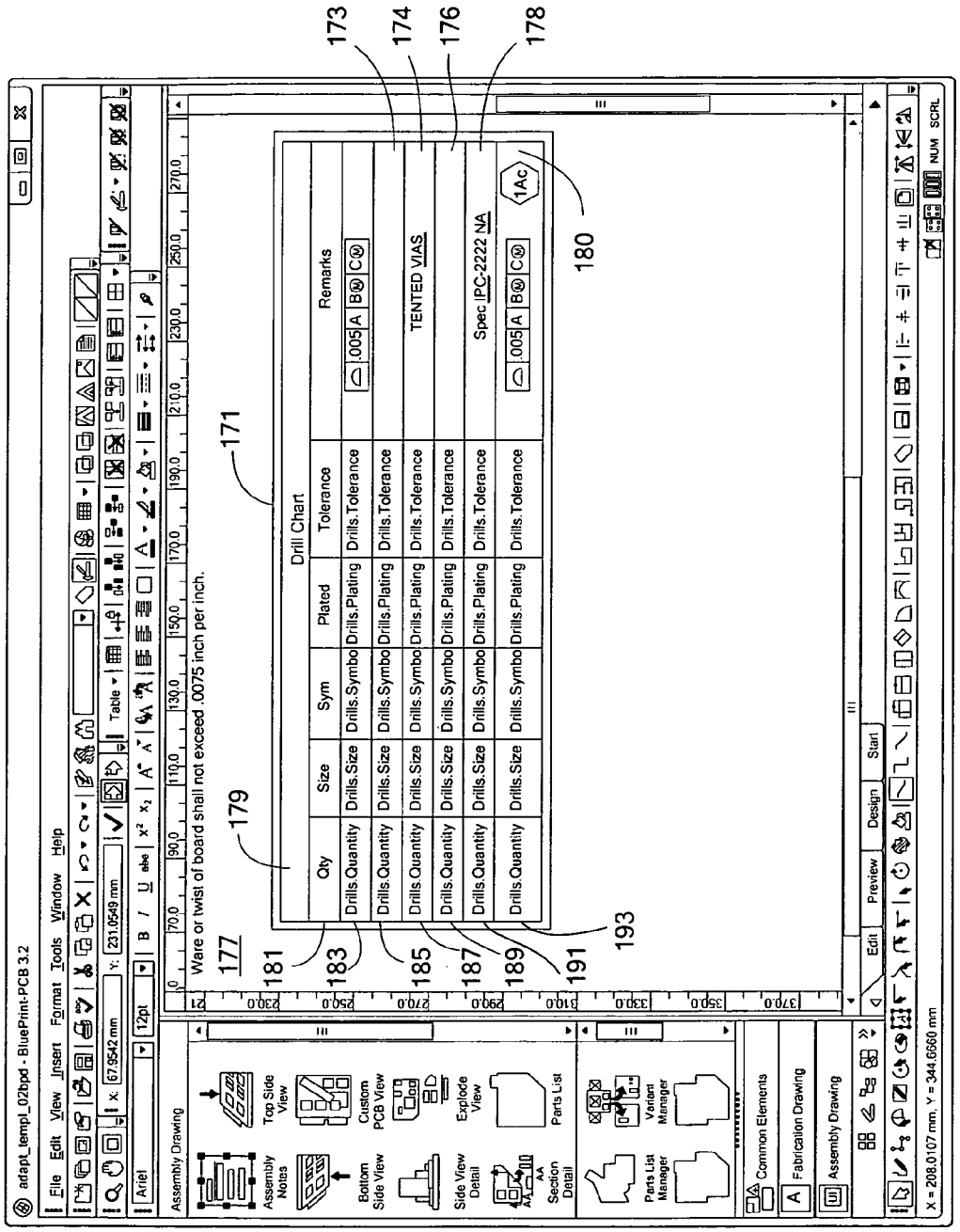
FIG. 7 shows an example of non-populated drill chart adaptive template in the edit adaptive template mode which provides for modifying the format of the drill chart adaptive template and/or modifying or adding additional user entered-data.
Figure 8:
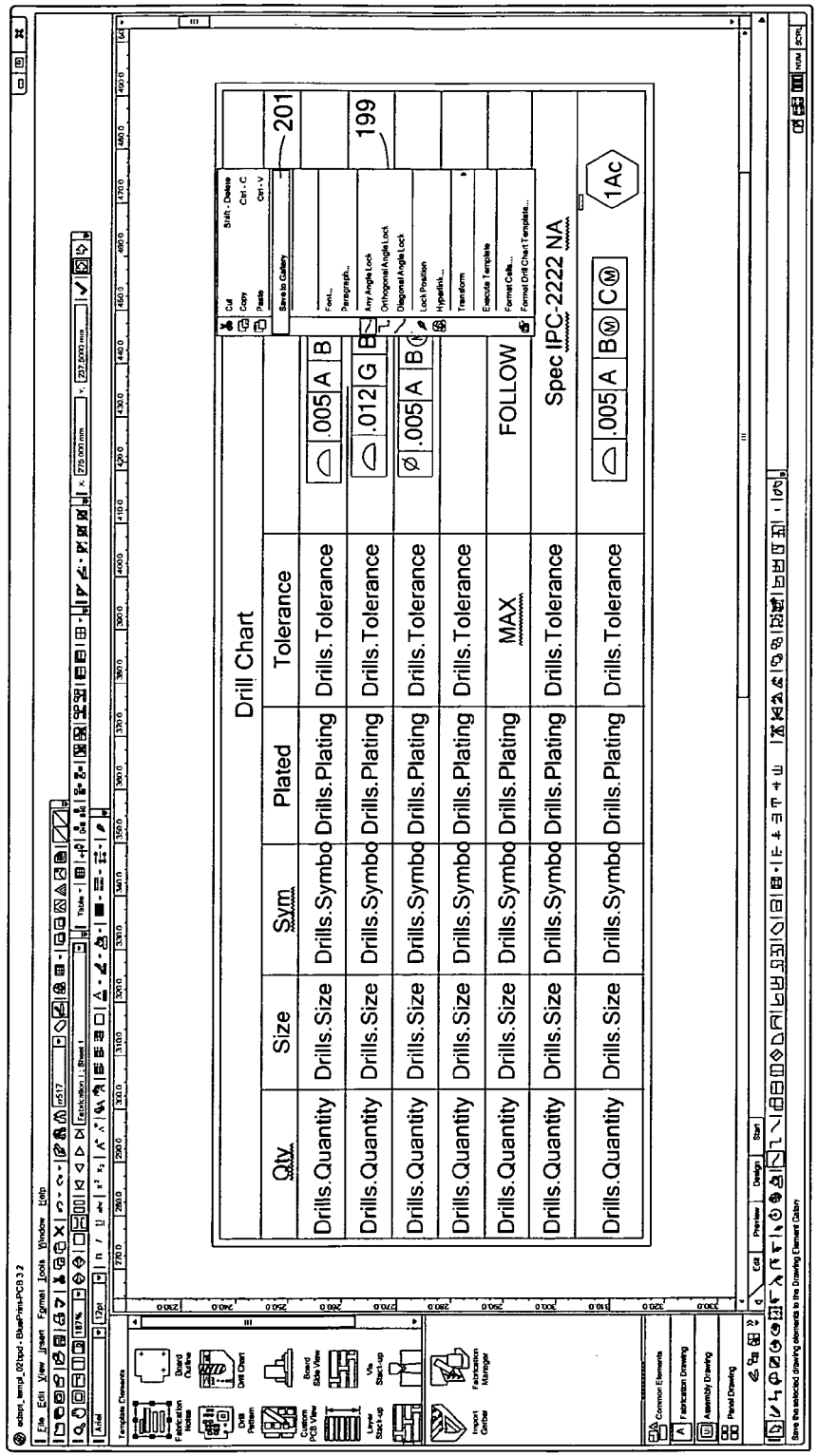
FIG. 8 is a view showing an example of saving the modified adaptive template shown in FIG. 7 to the element gallery.
Figure 9:
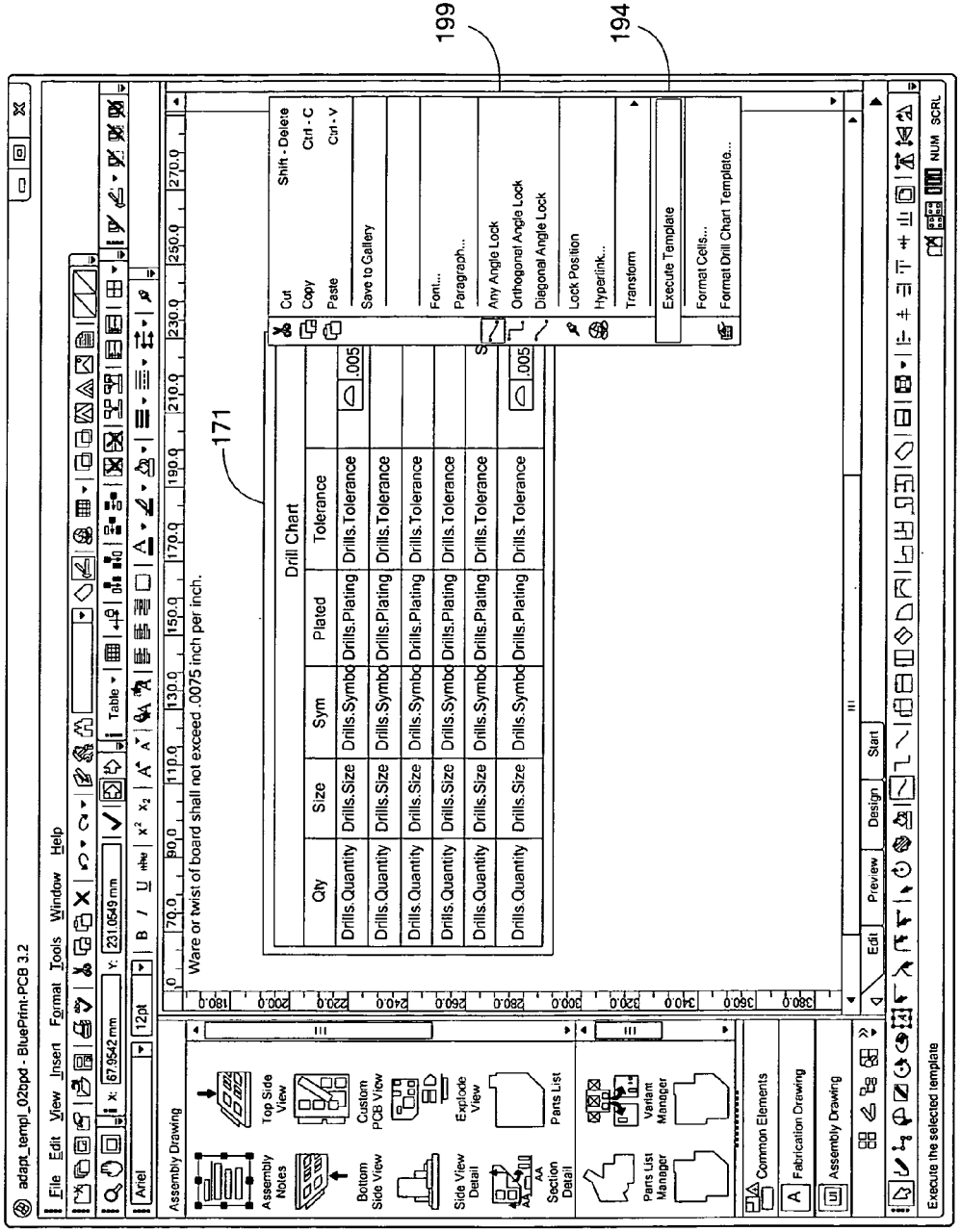
FIG. 9 is a view depicting an example of executing the drill chart adaptive template shown in FIG. 7 to populate the drill chart adaptive template with data as shown in FIG. 5.

One exemplary operation adaptive template system 140 for automated PCB manufacturing release package system 10 of one embodiment of this invention is now discussed. In this example, view 160, FIG. 2, shows an example of drill pattern 162 and the corresponding drill chart template 164. View 163, FIG. 3, shows an example of a user selecting format drill chart item 164 from dropdown box 165 which generate format drill chart templates dialog box 166. FIG. 4. The user then selects enable adaptive template checkbox 168 and clicks OK button 169 which causes adaptive template system 140, FIG. 1, to enable adding and retention of user-entered data directly into a drill chart adaptive template. View 170, FIG. 5, shows an example of populated drill chart adaptive template 171 where exemplary user-entered data is indicated at 173, 174, 176, 178, and 180. Next, edit adaptive template item 172, FIG. 6, is selected from dropdown box 175, which generates view 177, FIG. 7, of a non-populated drill chart adaptive template 171. Edit adaptive template mode may be used to modify the design of drill chart adaptive template 171, e.g., change the text, font, and the like, in row 179 and/or row 181, change the height of any of rows 179, 181, 183, 185, 187, 189, 191 or 193 or change the width of any of the cells in those rows. User-entered data 174, 176, 178 and 180 can also be added or modified, or new user-entered data can be deleted data, e.g., indicated at 173, to drill chart adaptive template 171 in the edit adaptive template mode. The changes to drill chart adaptive template 171 can be saved by selecting save to gallery item 199, FIG. 8 from dropdown box 201. The user can then populate drill chart adaptive template 171 by selecting execute template item 194, FIG. 7, from dropdown box 199. Adaptive template system 140 then populates drill chart adaptive template 171 using PCB CAD data 14 and data tables 54 from PCB CAD database 12, e.g., as shown in view 170, FIG. 5 where the exemplary previously entered user-entered data indicated at 173, 174, 176, 178 and 180, FIG. 6, is retained as well as any modified or added to user-entered data, e.g., as discussed above with reference to FIG. 7.

Figure 10:
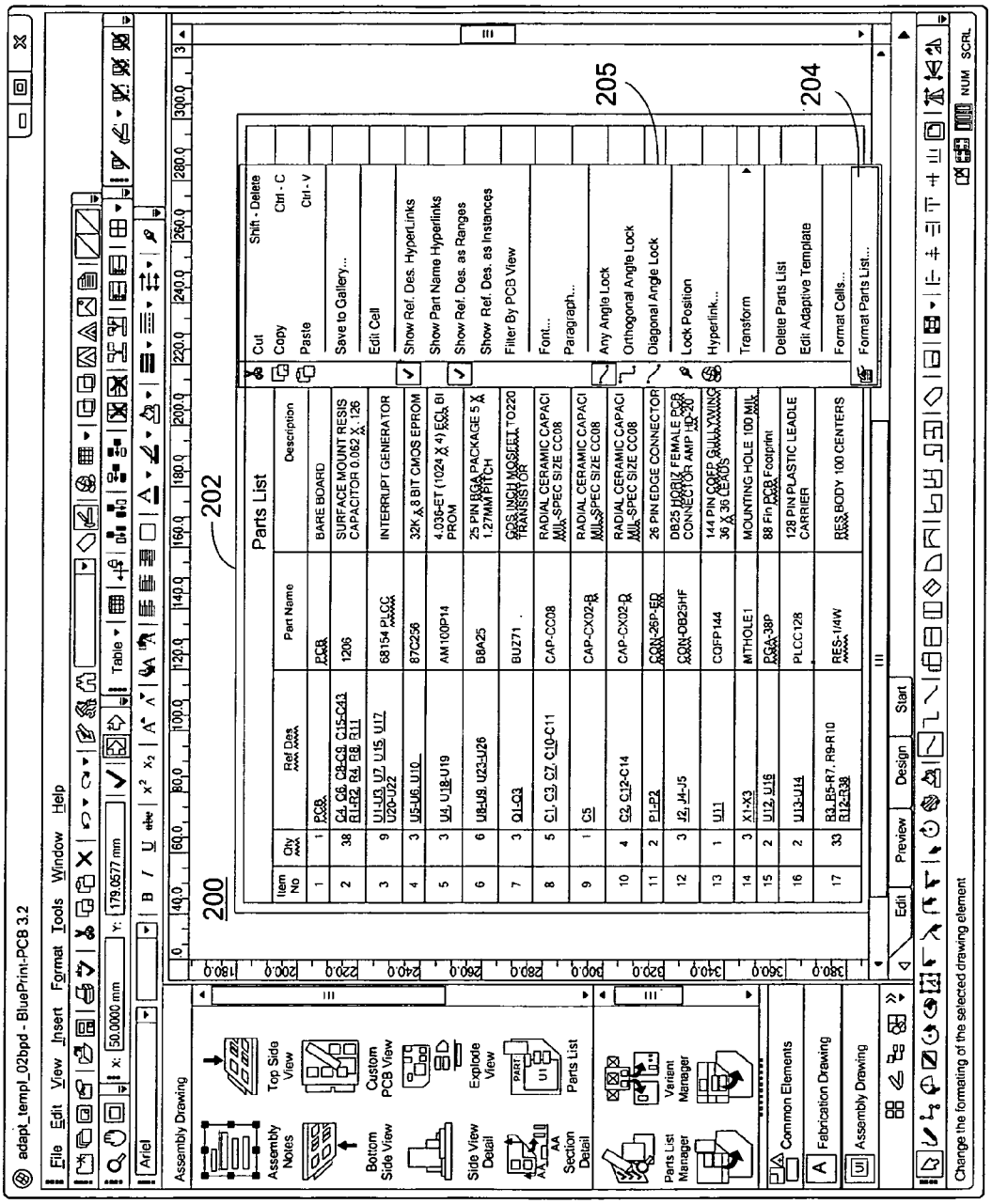
FIGS. 10 and 11 depict views of one example of initiating the adaptive template system of one embodiment of this invention for a parts list adaptive template.
Figure 11:
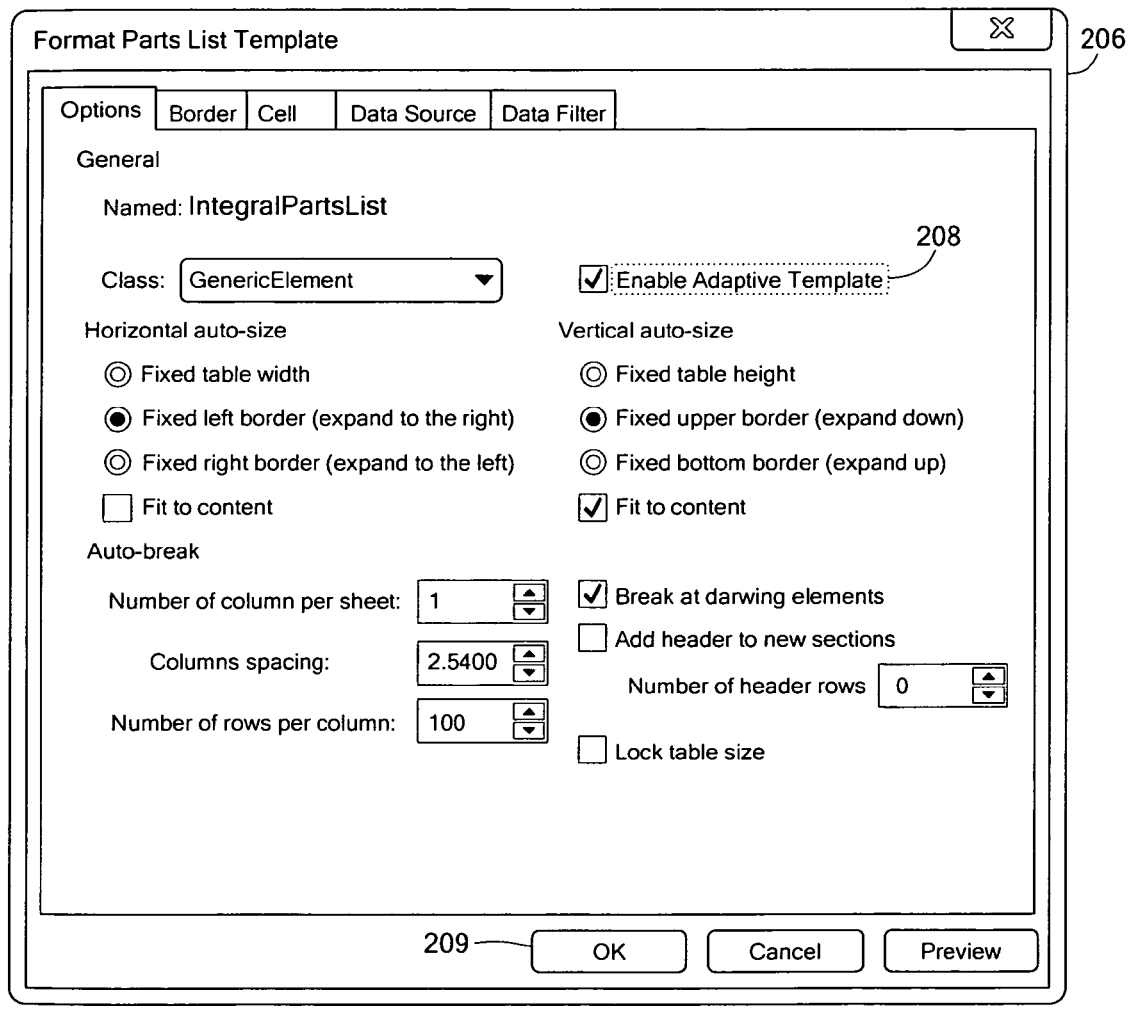
Figure 12:
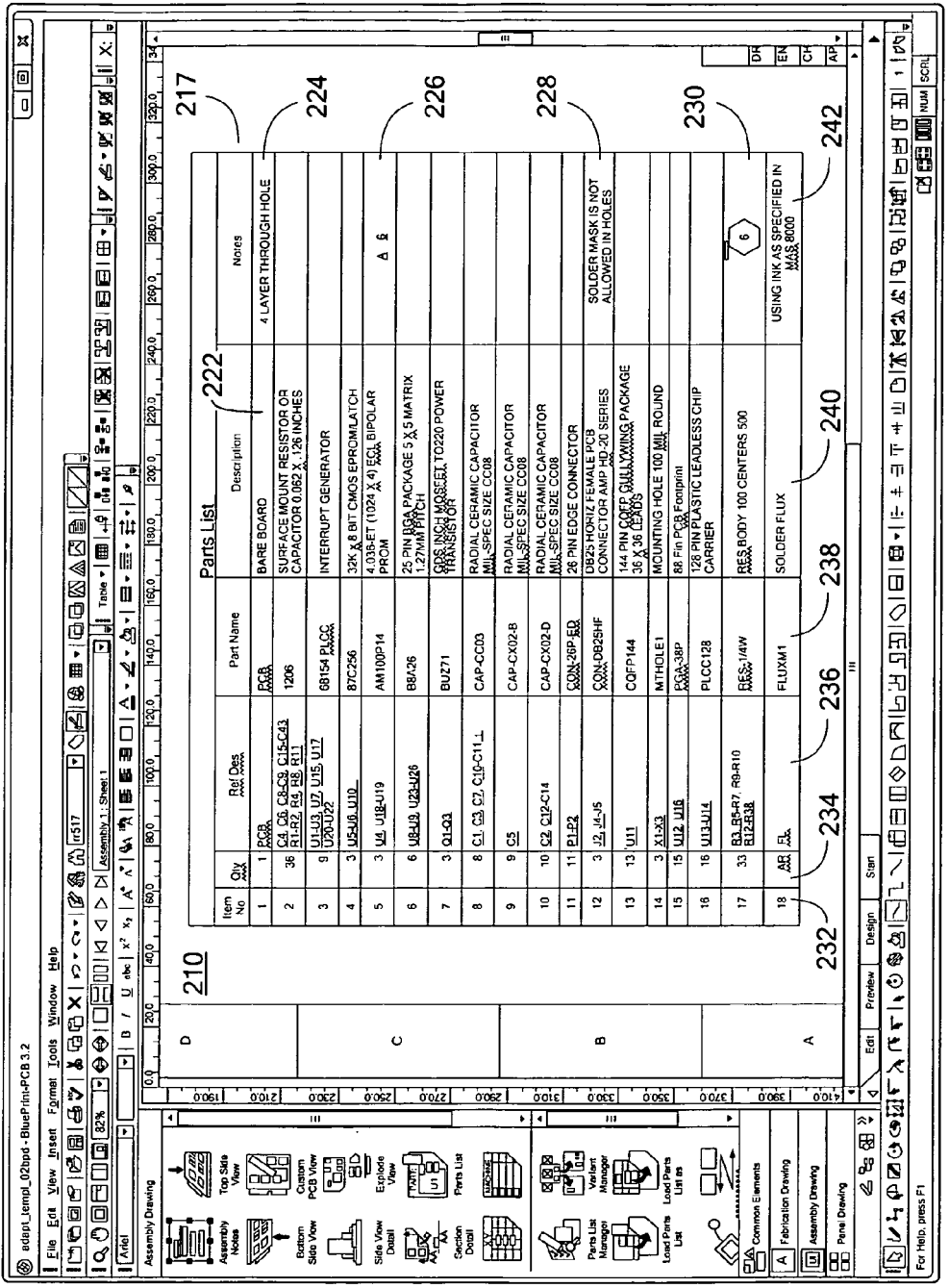
FIG. 12 is a view showing one example of a user adding data directly to a populated parts list adaptive template.
Figure 13:
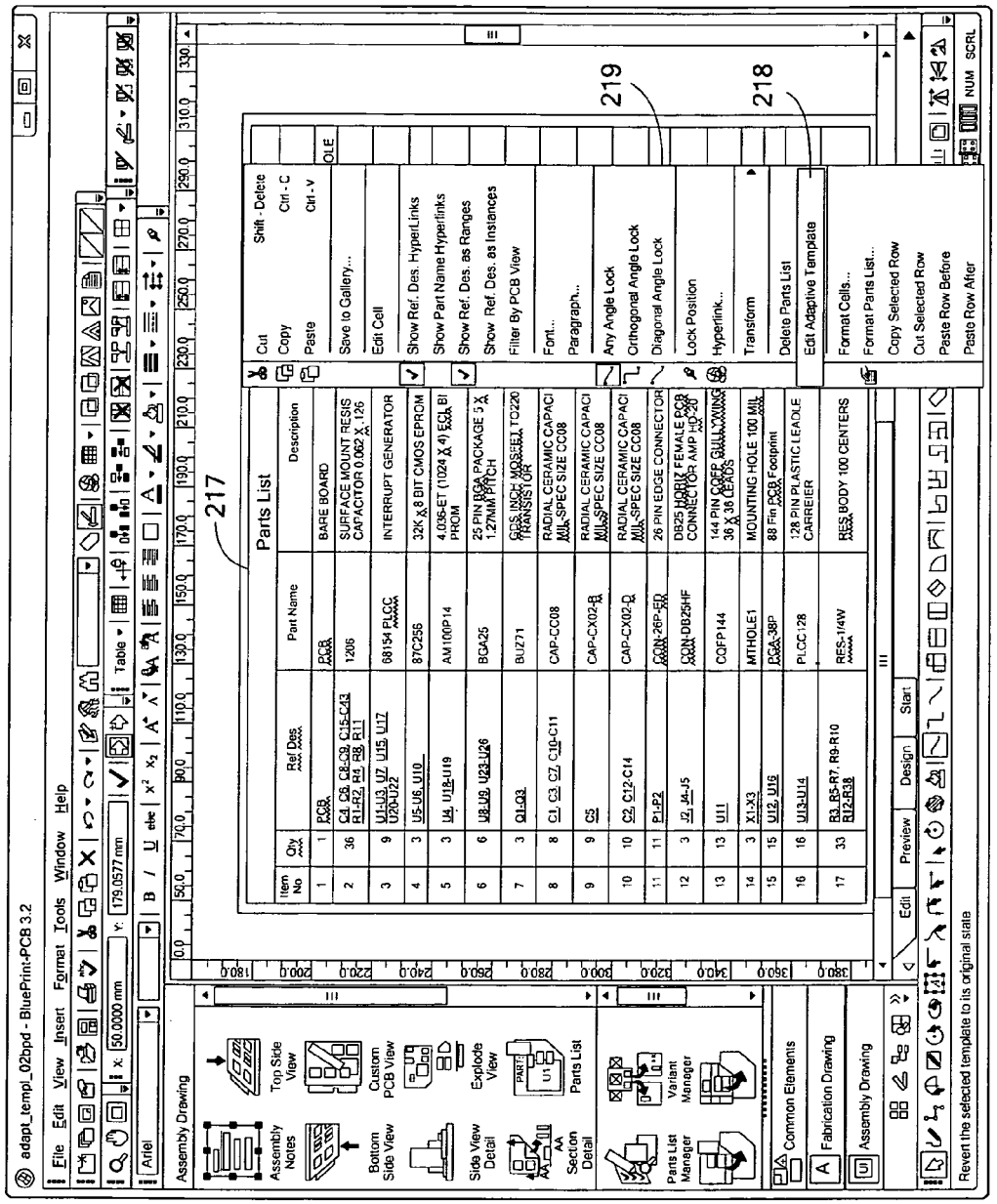
FIG. 13 is a view depicting one example of a user selecting the edit adaptive template mode to modify the parts list adaptive template shown in FIG. 12.

View 200, FIG. 10, shows an example of parts list template 202 where a user has selected format parts list item 204 from dropdown box 205 which generates dialog box 206, FIG. 11. The user then selects enable adaptive template checkbox 208 and click OK button 209 which causes adaptive template system 140 to enable adding and retention of user-entered data directly into a parts list adaptive template, similar as discussed above. View 210, FIG. 12, shows an example of populated parts list adaptive template 217 with exemplary user-entered data indicated at 222, 224, 226, 228, 230, 232, 234, 236, 238, 240 and 242. Next, edit adaptive template item 218, FIG. 13, is selected from dropdown box 219 to generate view 220, FIG. 14, of non-populated parts list adaptive template 217 which provides for the modification of parts list adaptive template 217, the modification of user-entered data 222-242, and as well as the additional user-entered data, e.g., as discussed above with reference to FIGS. 6 and 7.

Figure 15:
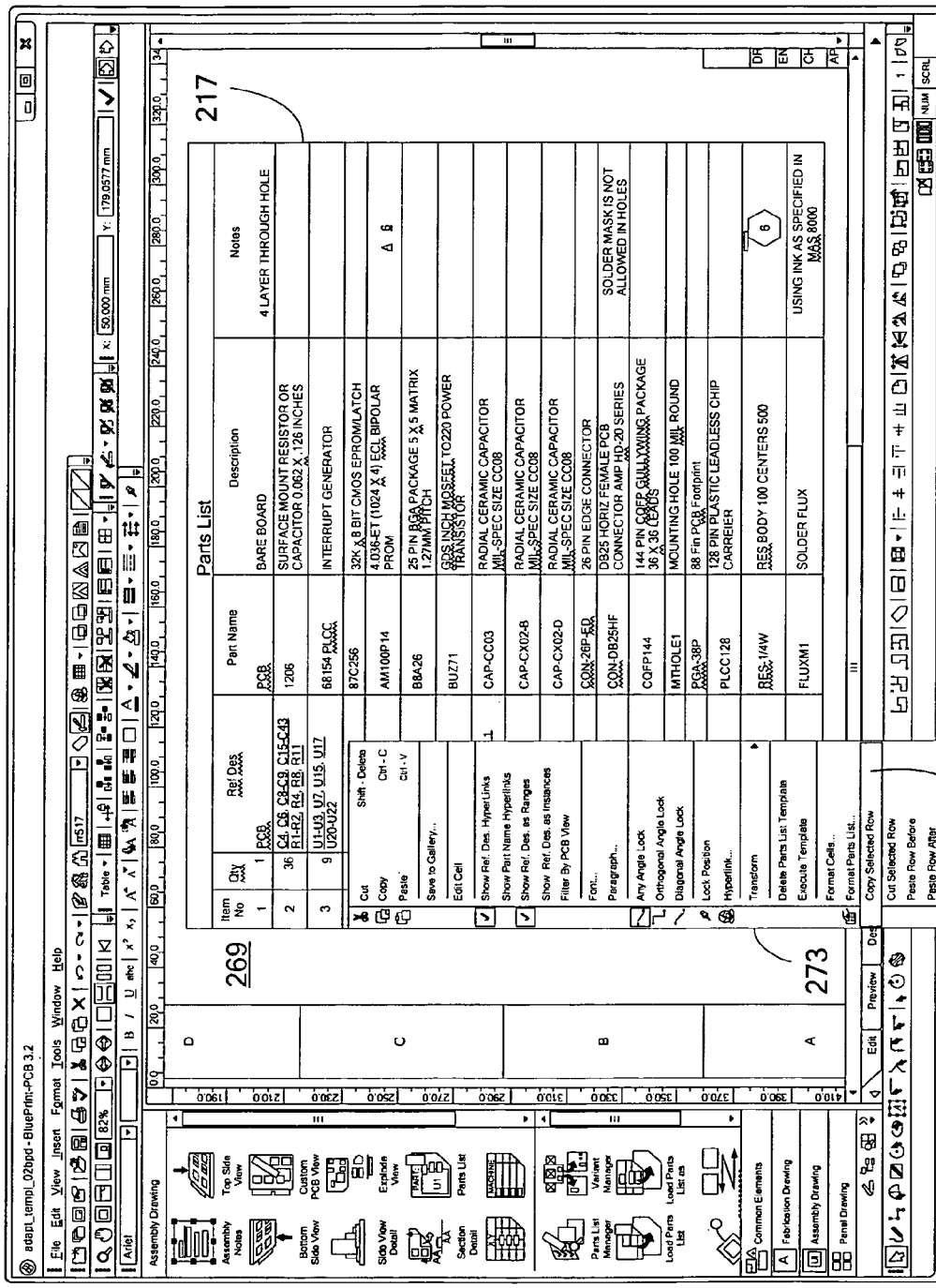
FIGS. 15-17 show examples of adding a row, deleting a row, and resizing a row of the drill chart adaptive template shown in FIG. 12.
Figure 16:
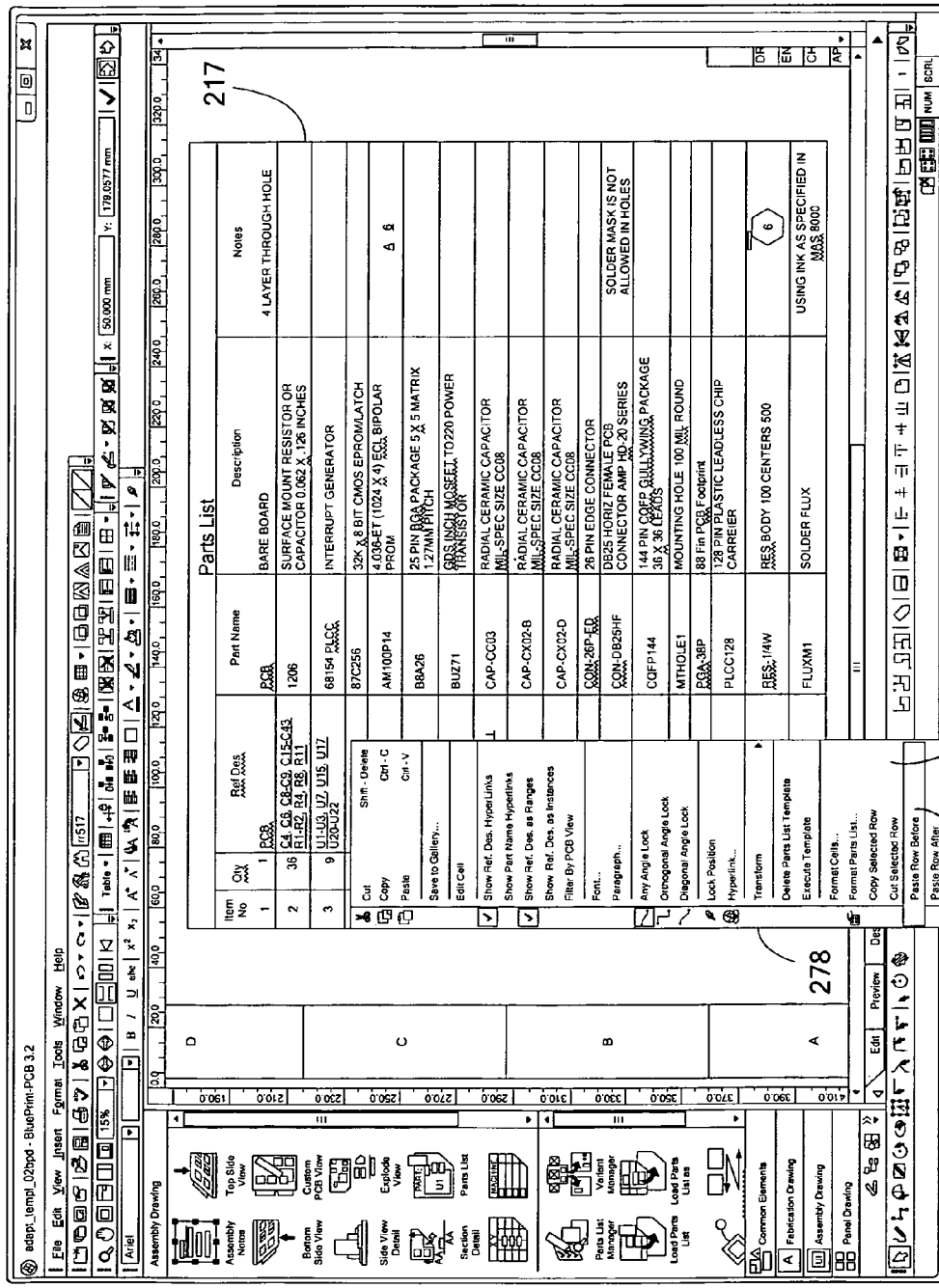
Figure 17:
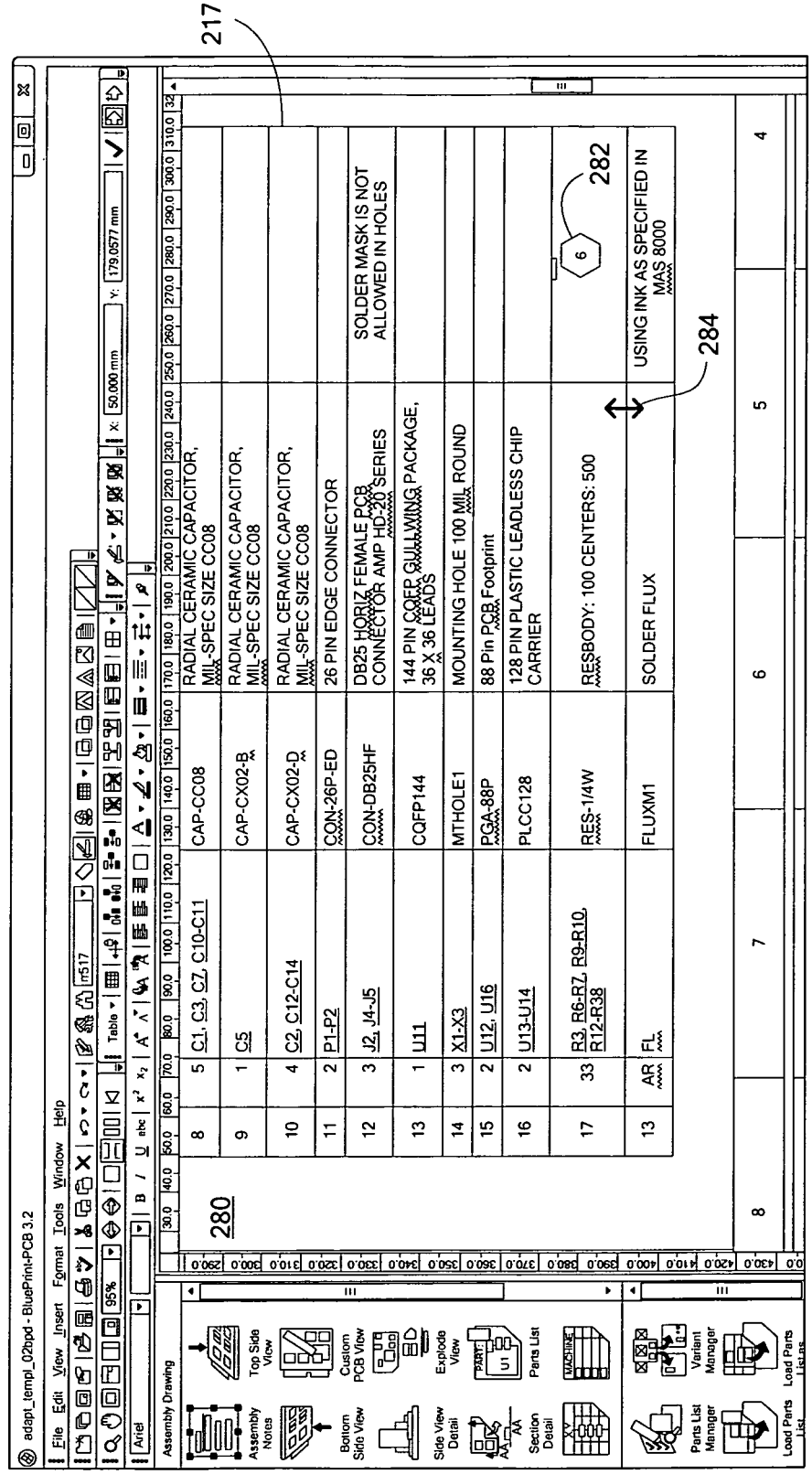
Figure 18:
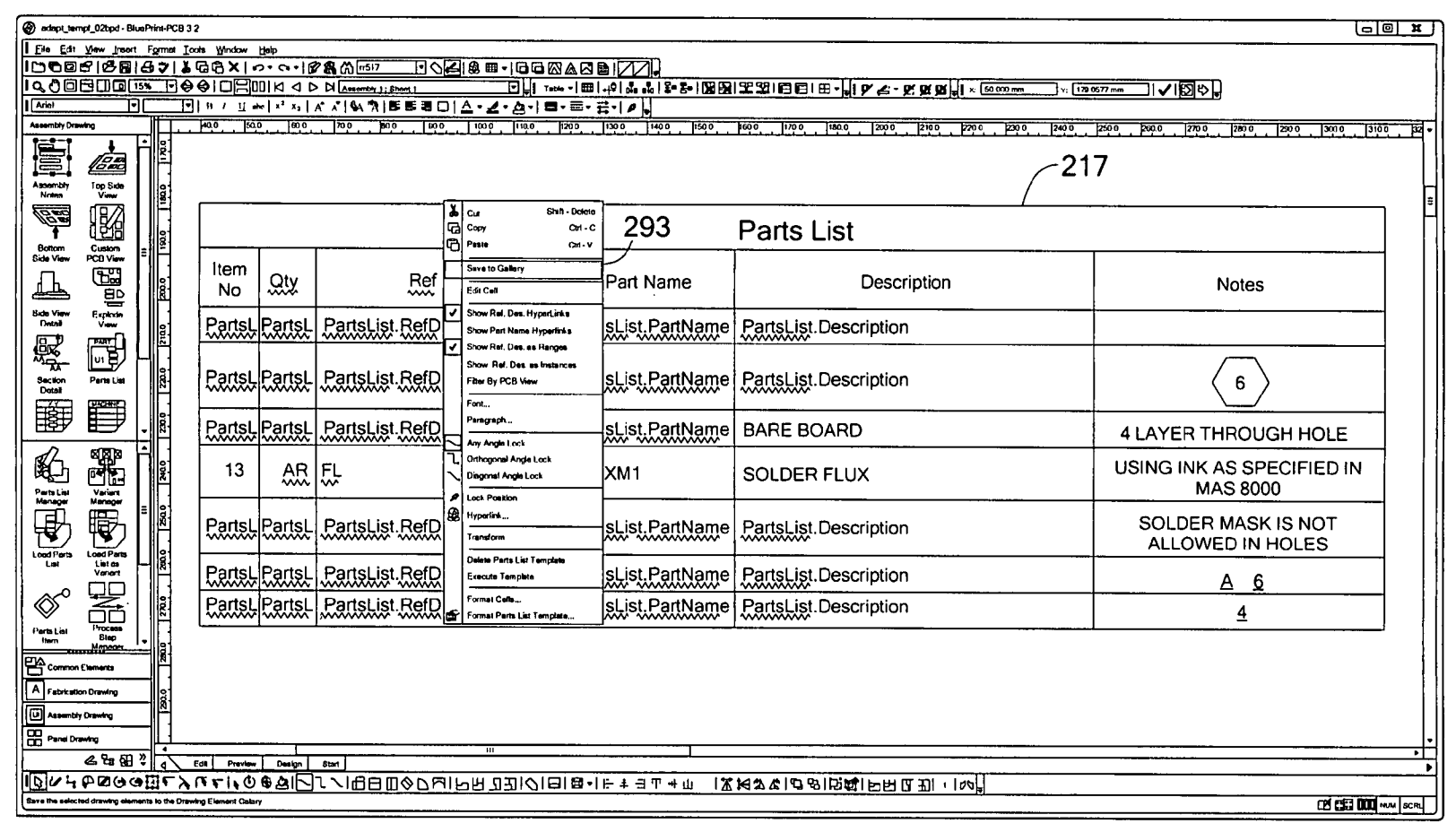
Figure 19:
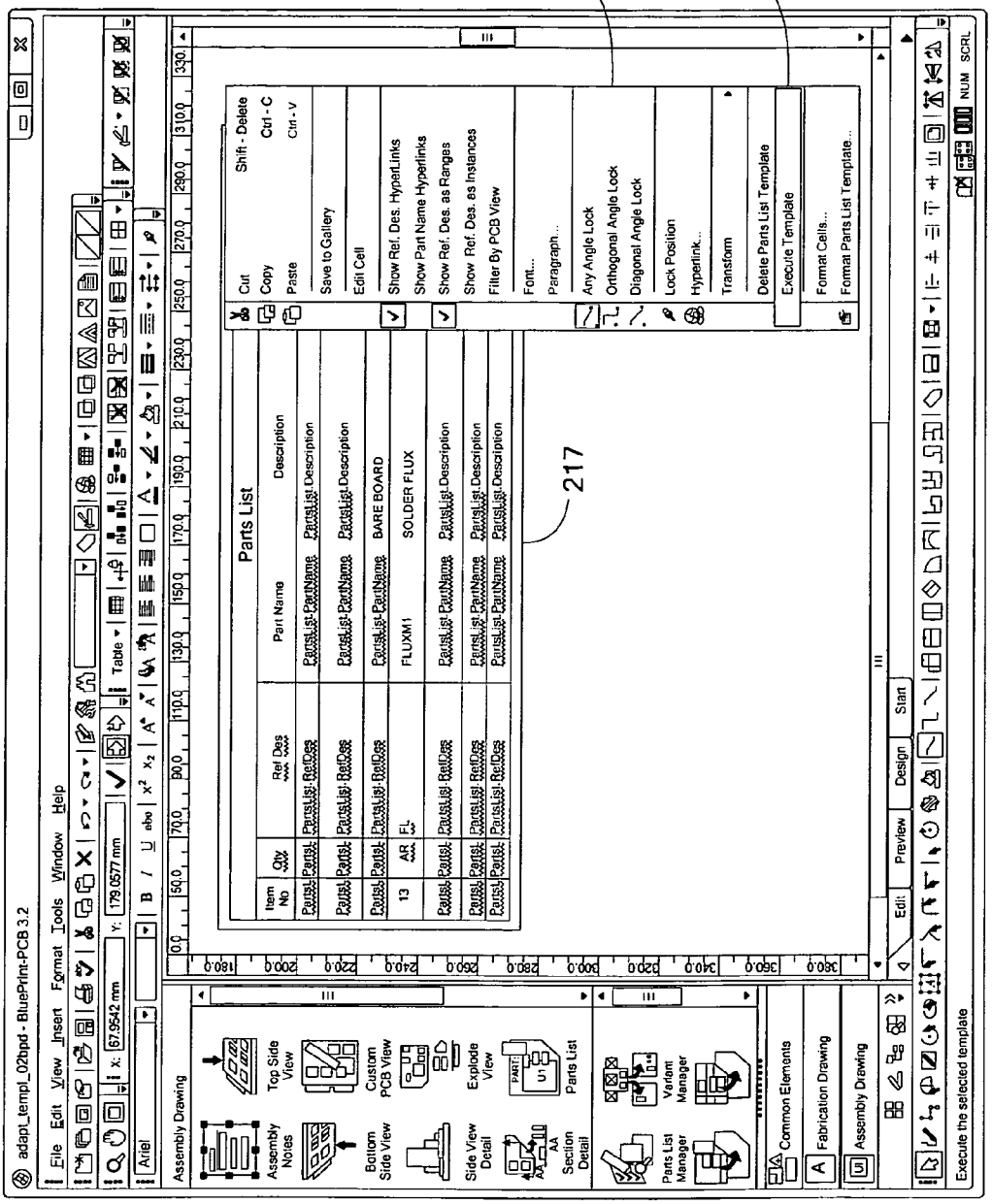
FIG. 19 shows a view of an example of a user executing the parts list adaptive template shown in FIG. 14 to populate the adaptive template with the PCB data as shown in FIG. 12.

As can be seen, adaptive template system 140 preferably provides for the user-entered data to include one or more of the following: adding or modifying text, adding or modifying a drawing element, inserting or modifying a reference to a note, parts list items, document variables or details, and the like. System 140 also provides for adding a row at the top, bottom, or middle of the adaptive template 21, resizing a row, or deleting a row in an adaptive template. For example, view 269, FIG. 15, shows an example of how a row can be added to parts list adaptive template 217 by selecting copy selected row item 271 from drop down box 273 and then pasting the row before or after a desired row, e.g., as shown by paste row before item 275, FIG. 16, or paste row after item 277. Additionally, a row can be deleted by selecting cut selected row item 279 from drop down box 278. View 280, FIG. 17, shows an example of resizing row 282 as indicated by arrow 284 using a standard controls. Similarly, as discussed above, the changes to parts list adaptive template 217 can be saved to drawing elements gallery by selecting save to gallery item 293, FIG. 18. The user can then populate adaptive parts list template 217 by selecting execute template item 250, FIG. 19, from dropdown box 252 which then populates parts list adaptive template 217, using PCB CAD data 14 and data tables 54 from PCB CAD data base 12, e.g., as shown in view 210 FIG. 12.

Figure 20:
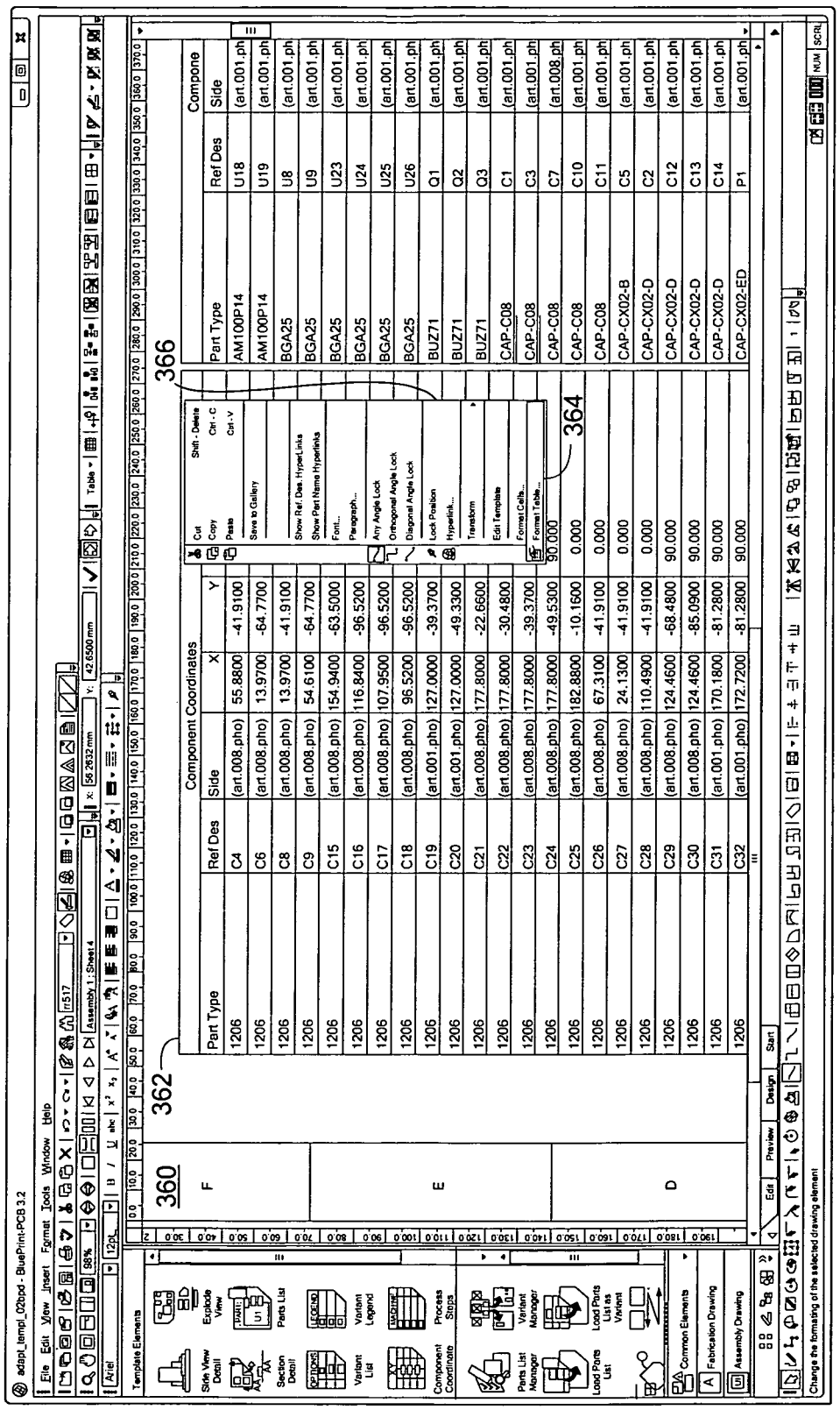
FIGS. 20-22 depict examples of a component coordinate adaptive template in accordance with one embodiment of this invention.
Figure 21:
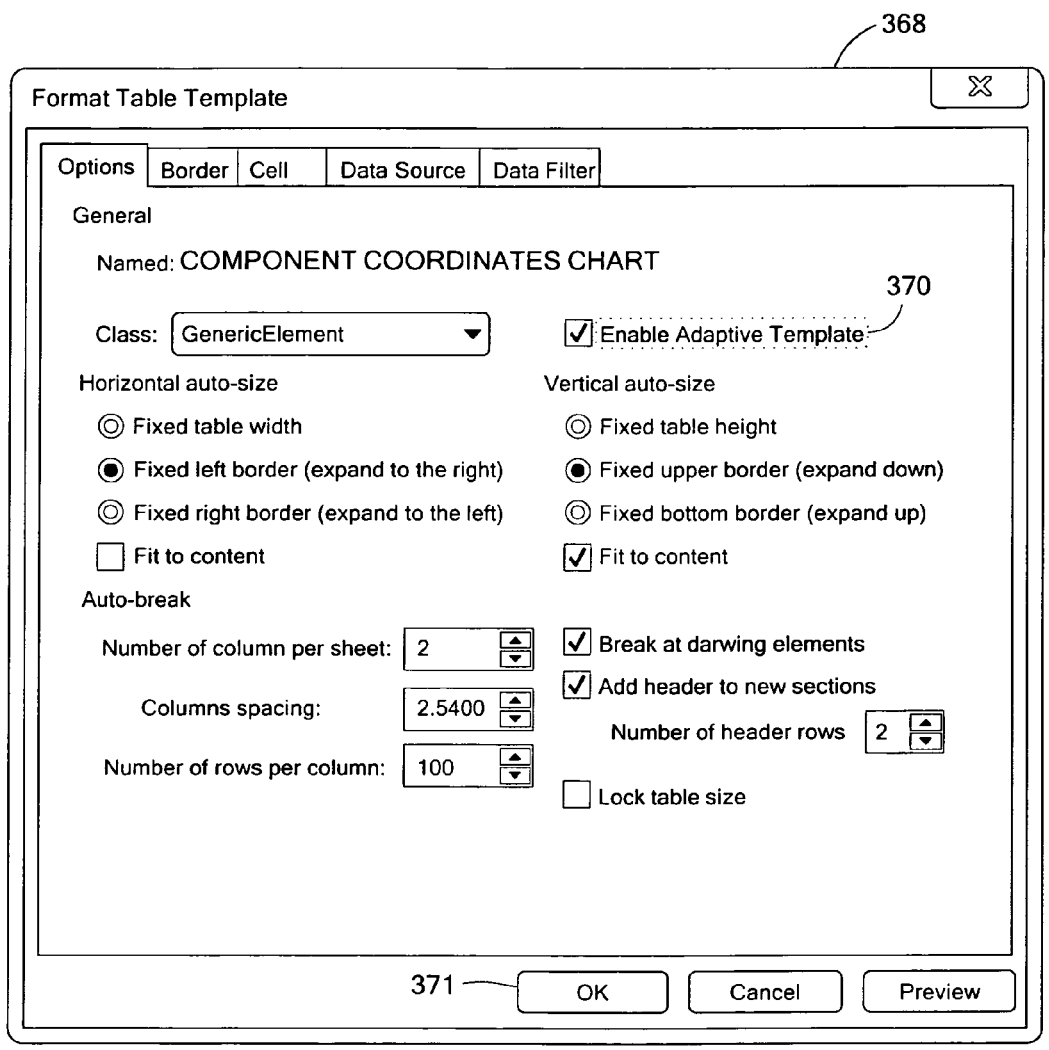
Figure 22:
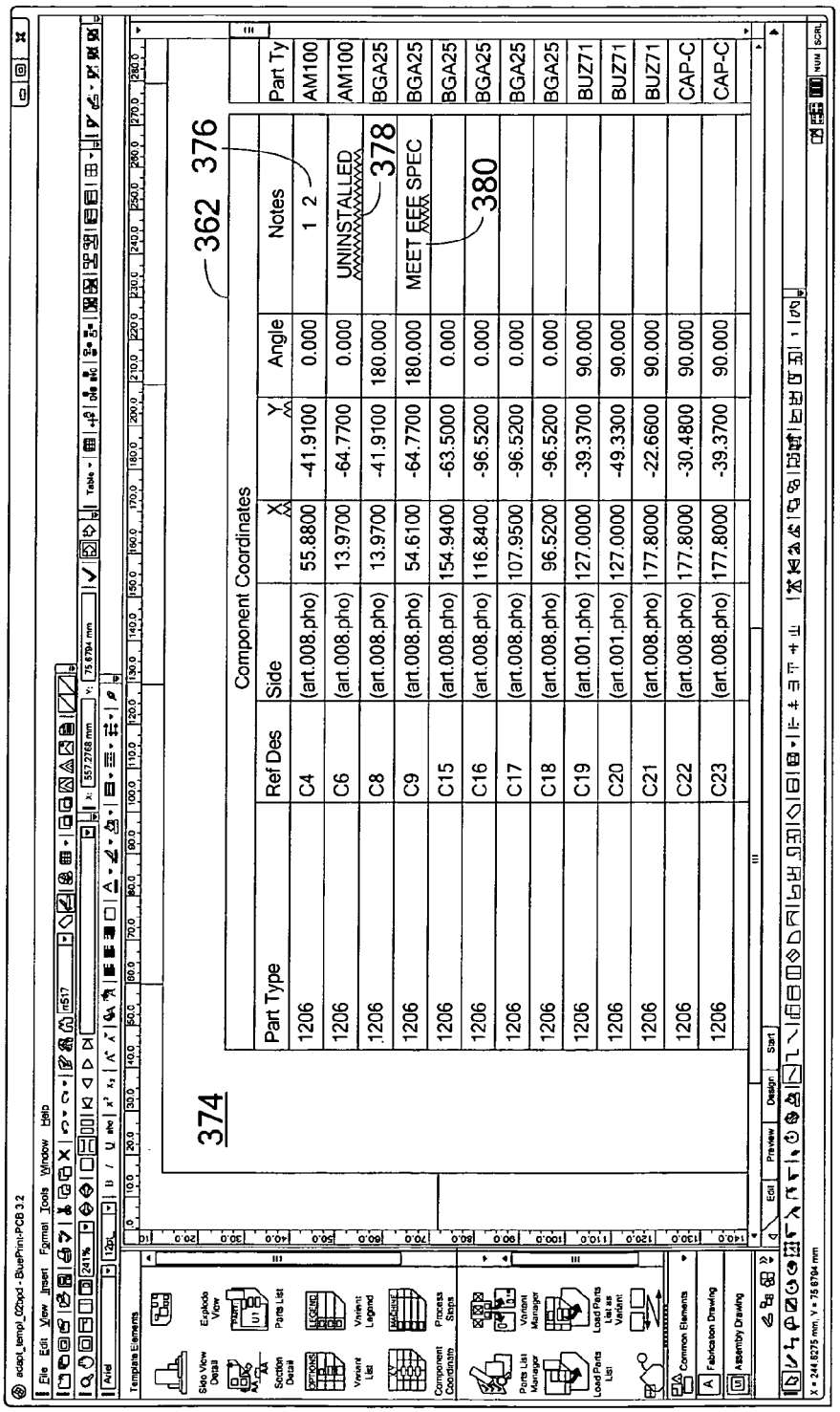

View 360, FIG. 20, shows an example of a component coordinate template 362 where the user has selected format table item 364 from dropdown box 366 which generates dialog box 368, FIG. 21. In this example, the user selects enable adaptive template checkbox 370 and clicks OK button 371 which causes adaptive template system 140 to enable adding and retention of user-entered data directly into a component coordinate adaptive template. View 374, FIG. 22, shows an example of populated component coordinate adaptive template 362 with exemplary user-entered data indicated at 376, 378 and 380, e.g., as discussed above. The edit adaptive template mode may also be used for component coordinate adaptive template 362, as discussed above.

Figure 23:
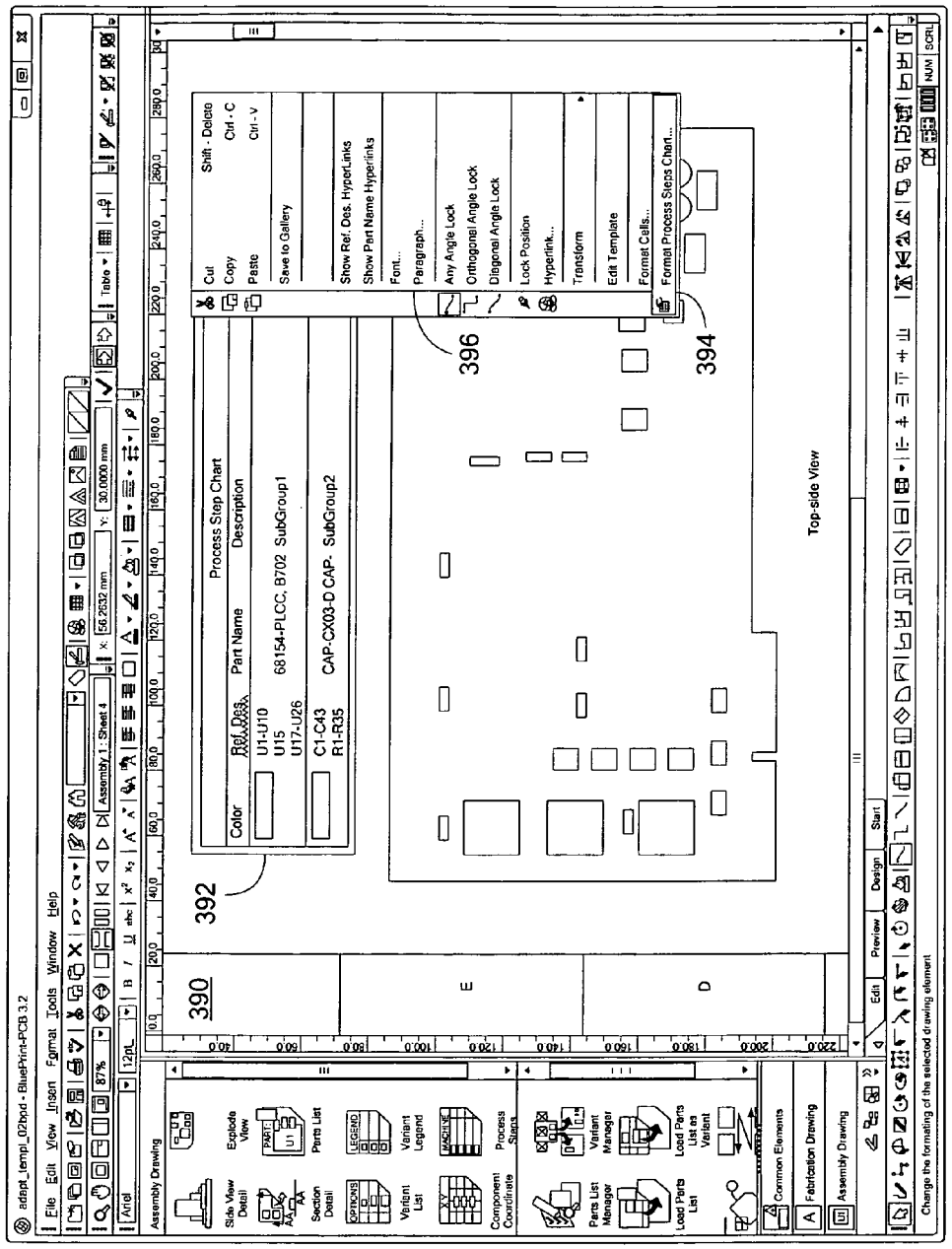
FIGS. 23-25 depict examples of a process step adaptive template in accordance with one embodiment of this invention.
Figure 24:
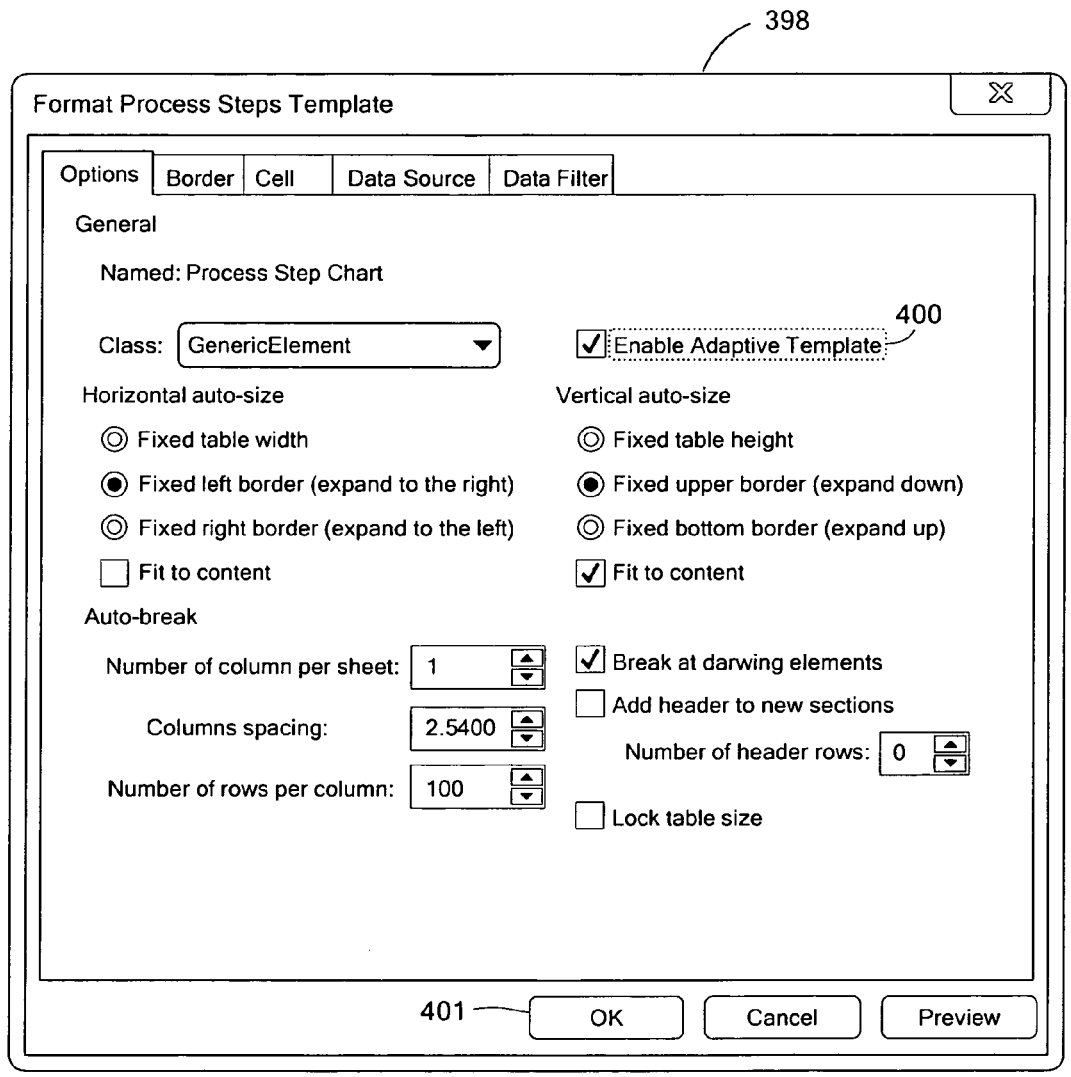
Figure 25:
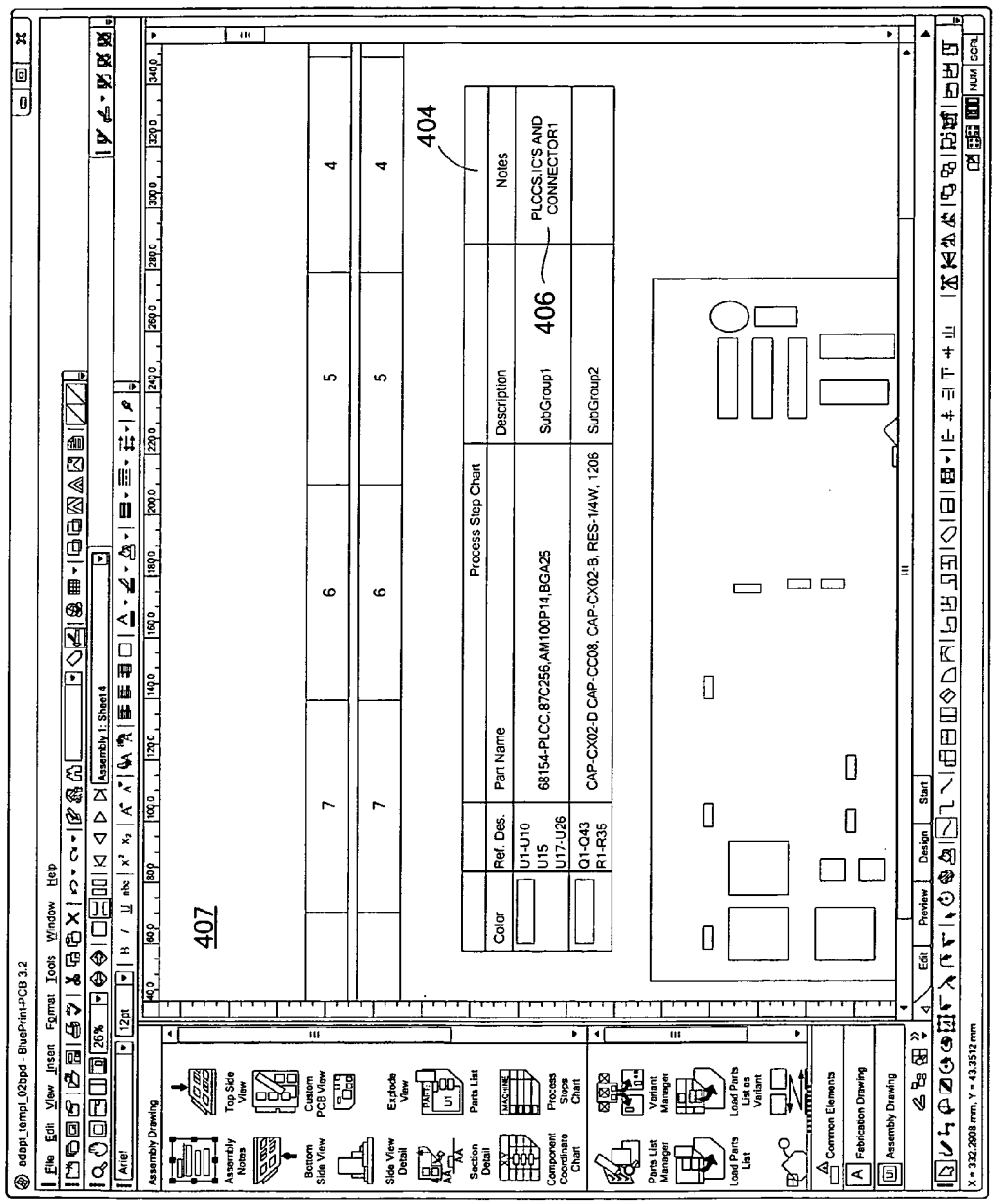

View 390, FIG. 23, shows an example of a process step chart template 392 where the user has selected format process step chart item 394 from dropdown box 396 to generate dialog box 398, FIG. 24. The user then selects enable adaptive template checkbox 400 and clicks OK button 401 which causes adaptive template system 140 to enable adding and retention of user-entered data directly into a process step chart adaptive template. View 407, FIG. 25, shows an example of populated process step chart adaptive template 404 with exemplary user-entered data indicated at 406, similar as discussed above. The edit adaptive template mode may also be used for process step chart adaptive template 404, as discussed above.

Figure 26:
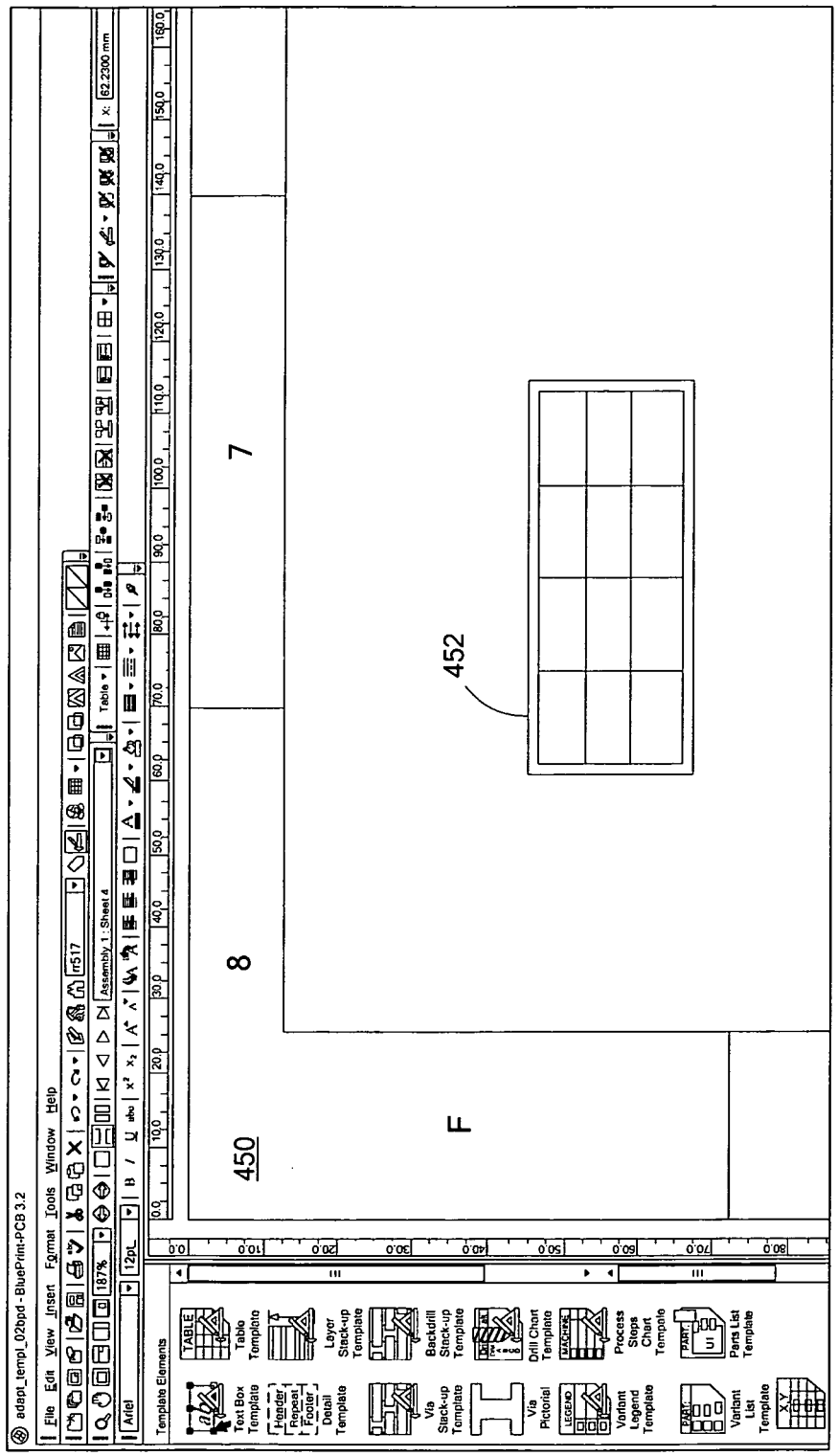
FIG. 26-31 show examples of a generic table template linked to a layers data table, a nets table, and a user-defined table and an example of a user-defined adaptive template in accordance with one embodiment of this invention.
Figure 27:
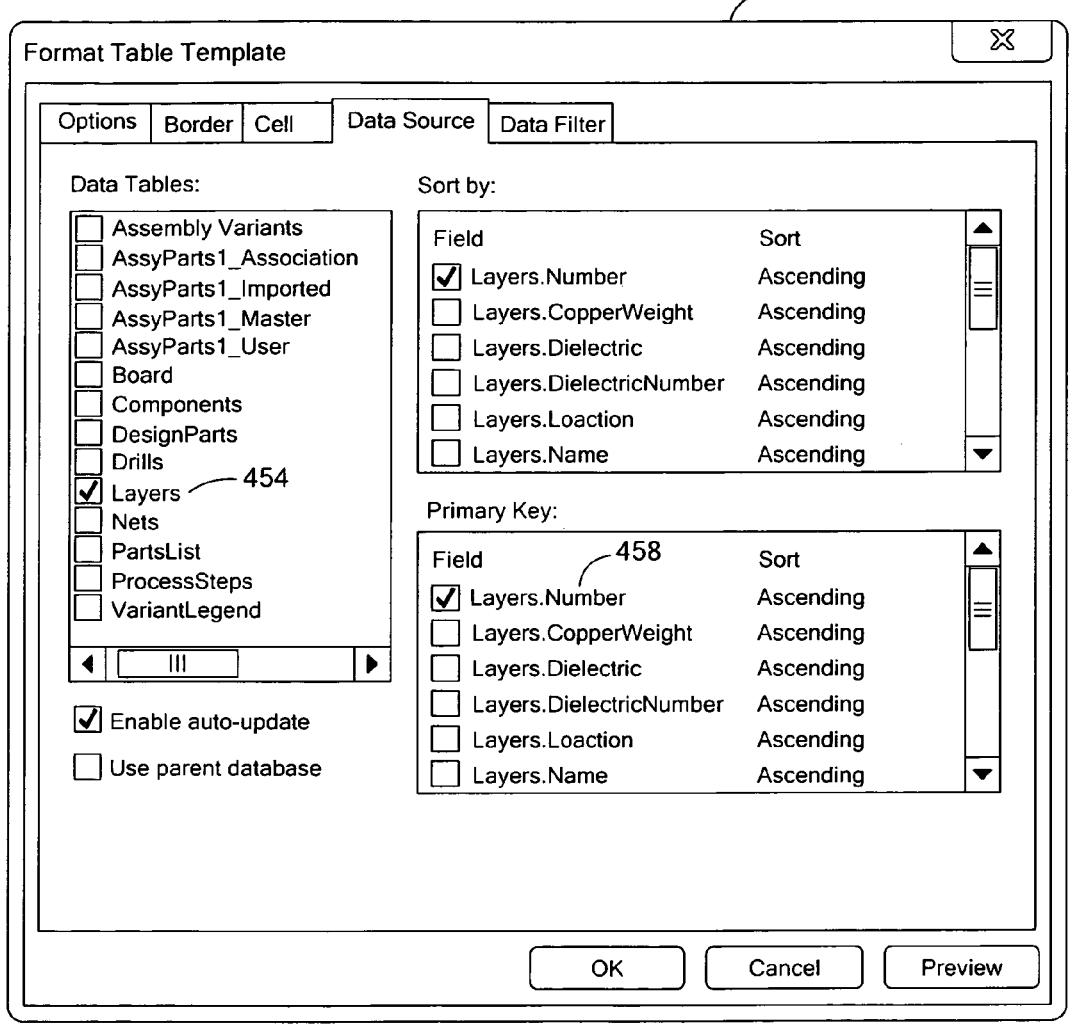
Figure 28:
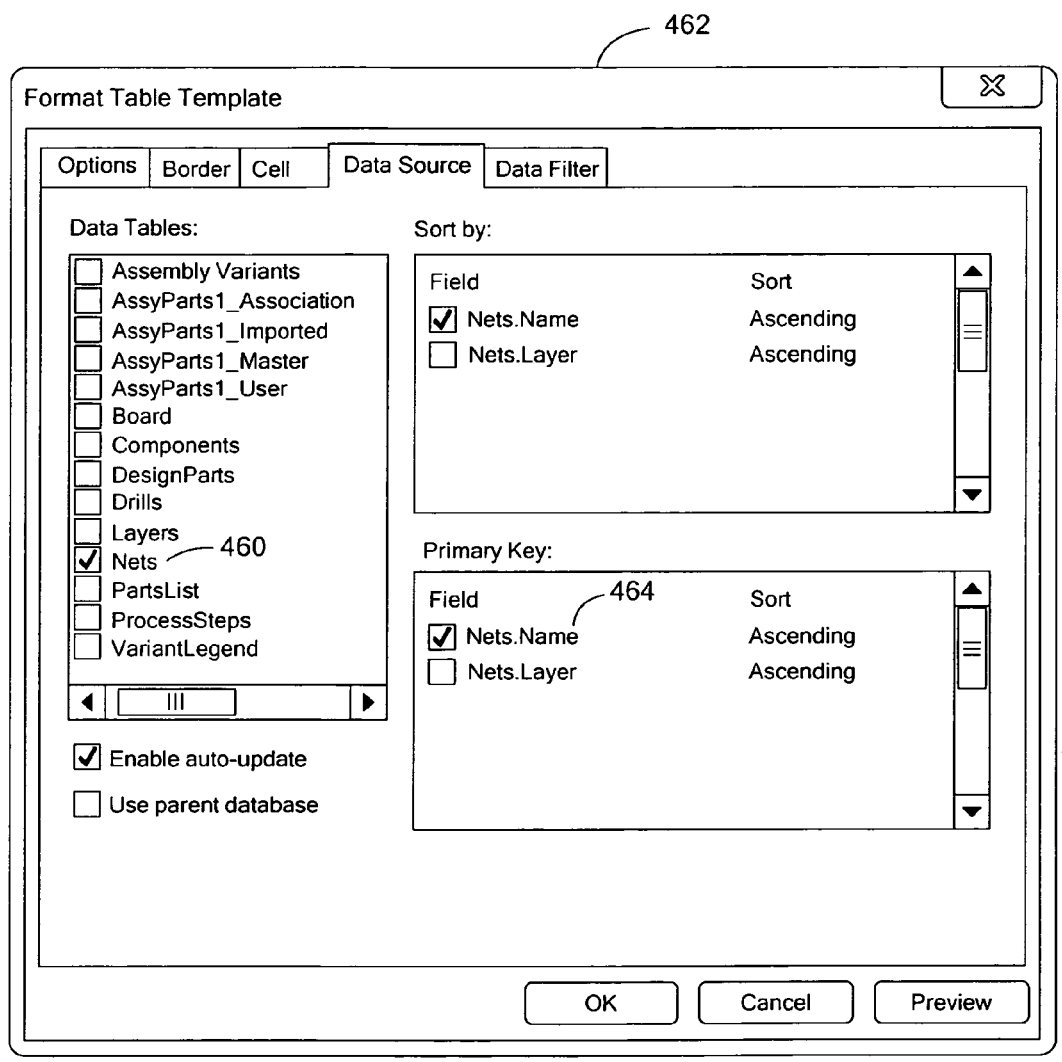
Figure 29:
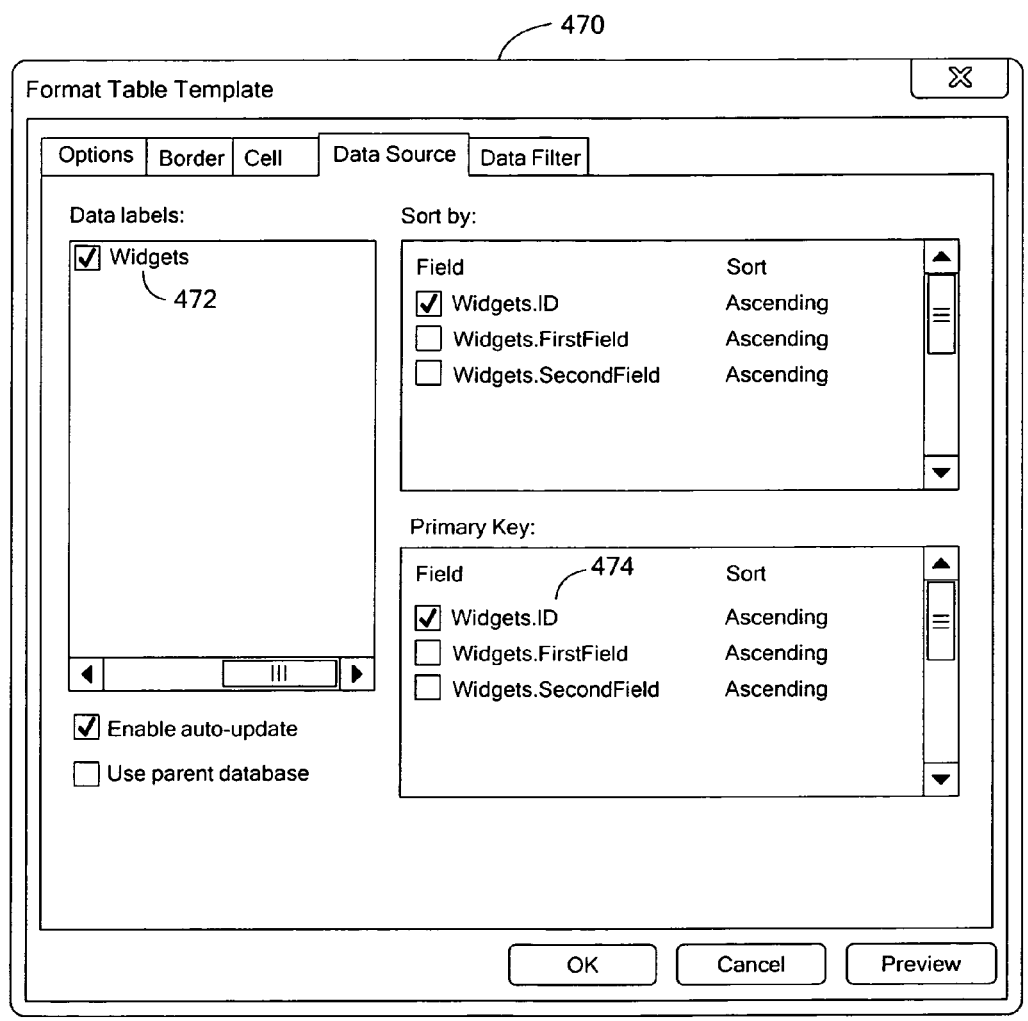
Figure 30:
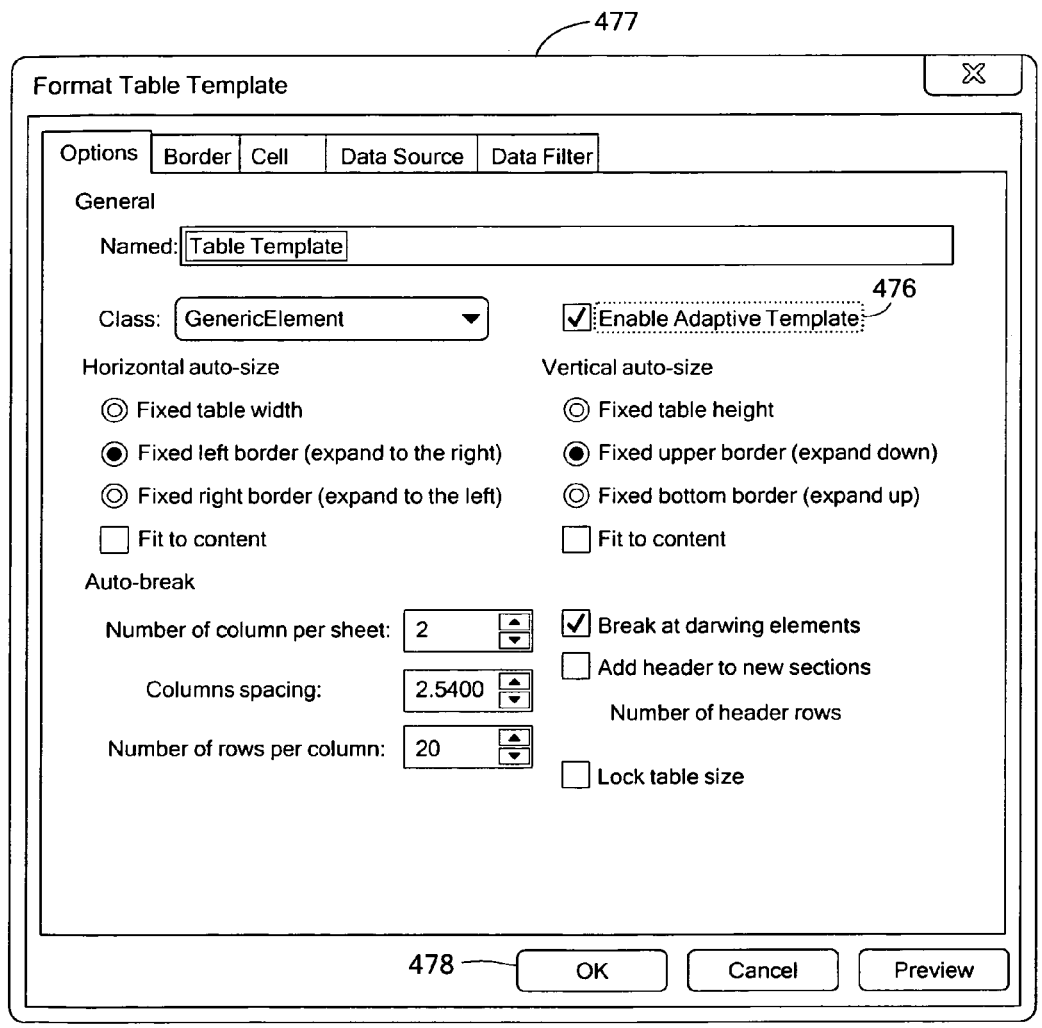
Figure 31:
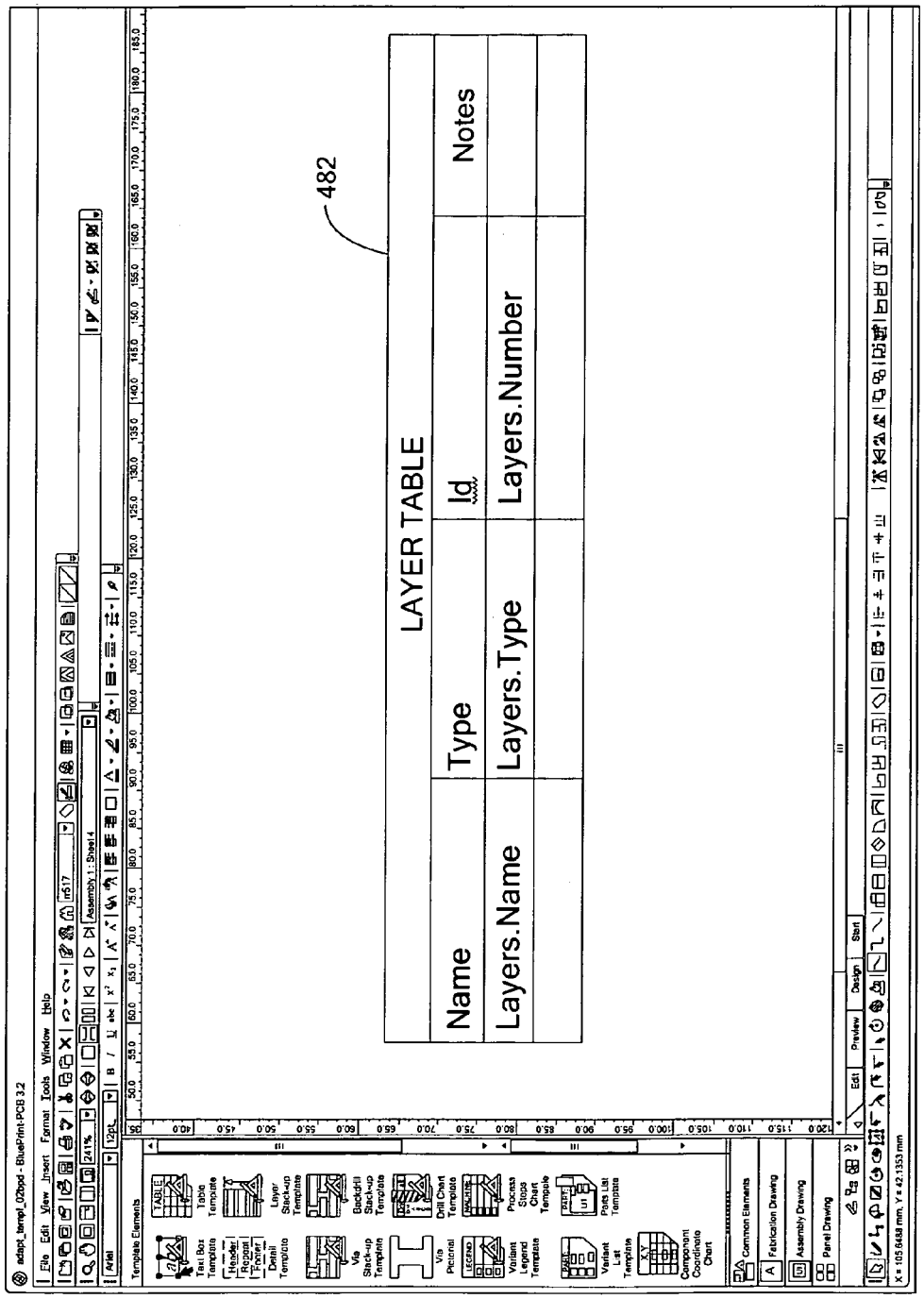
Figure 32:
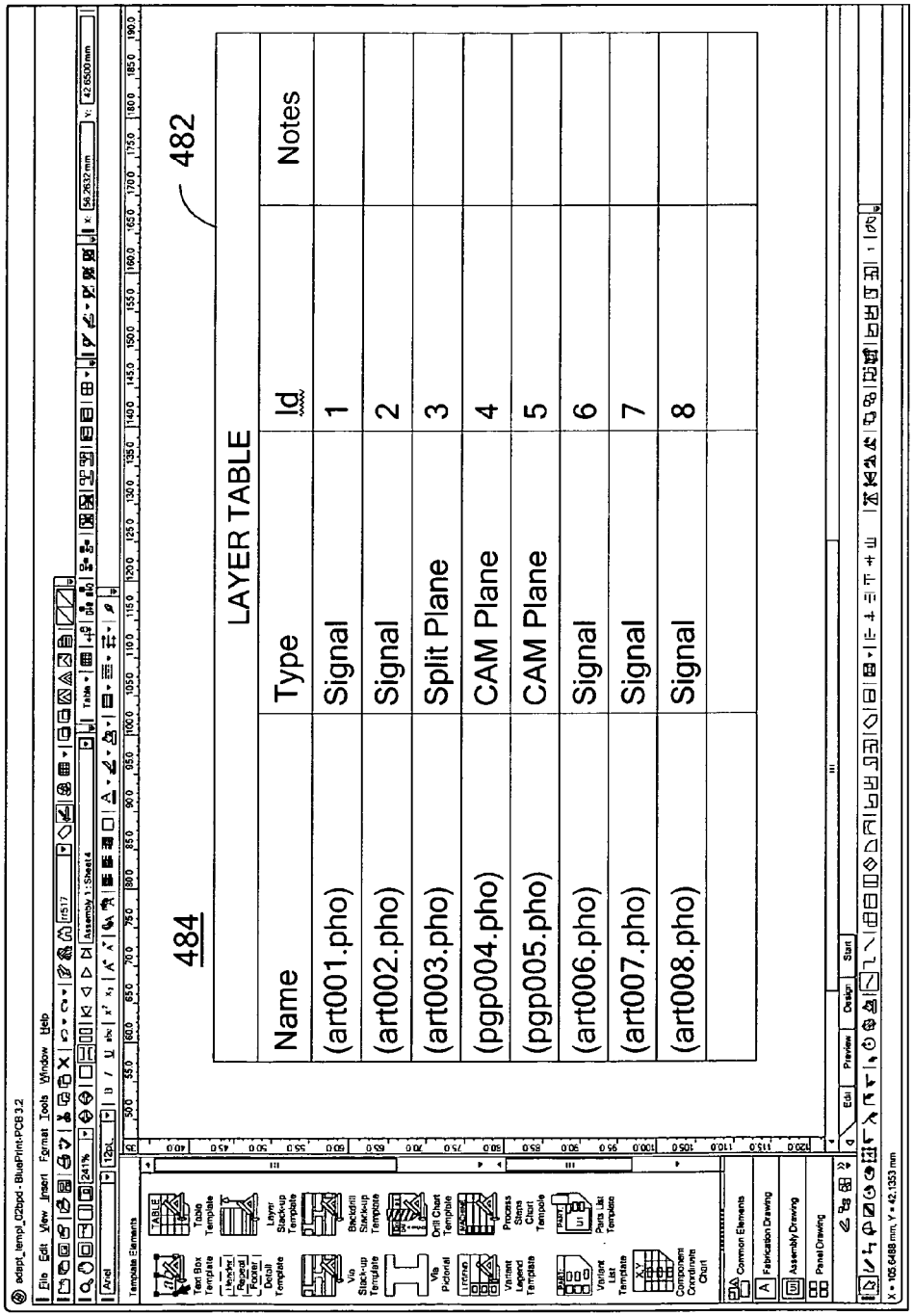
FIG. 32 shows a view of an example of a generic table adaptive template linked to the layers data table as shown in FIG. 31 populated with data.
Figure 33:
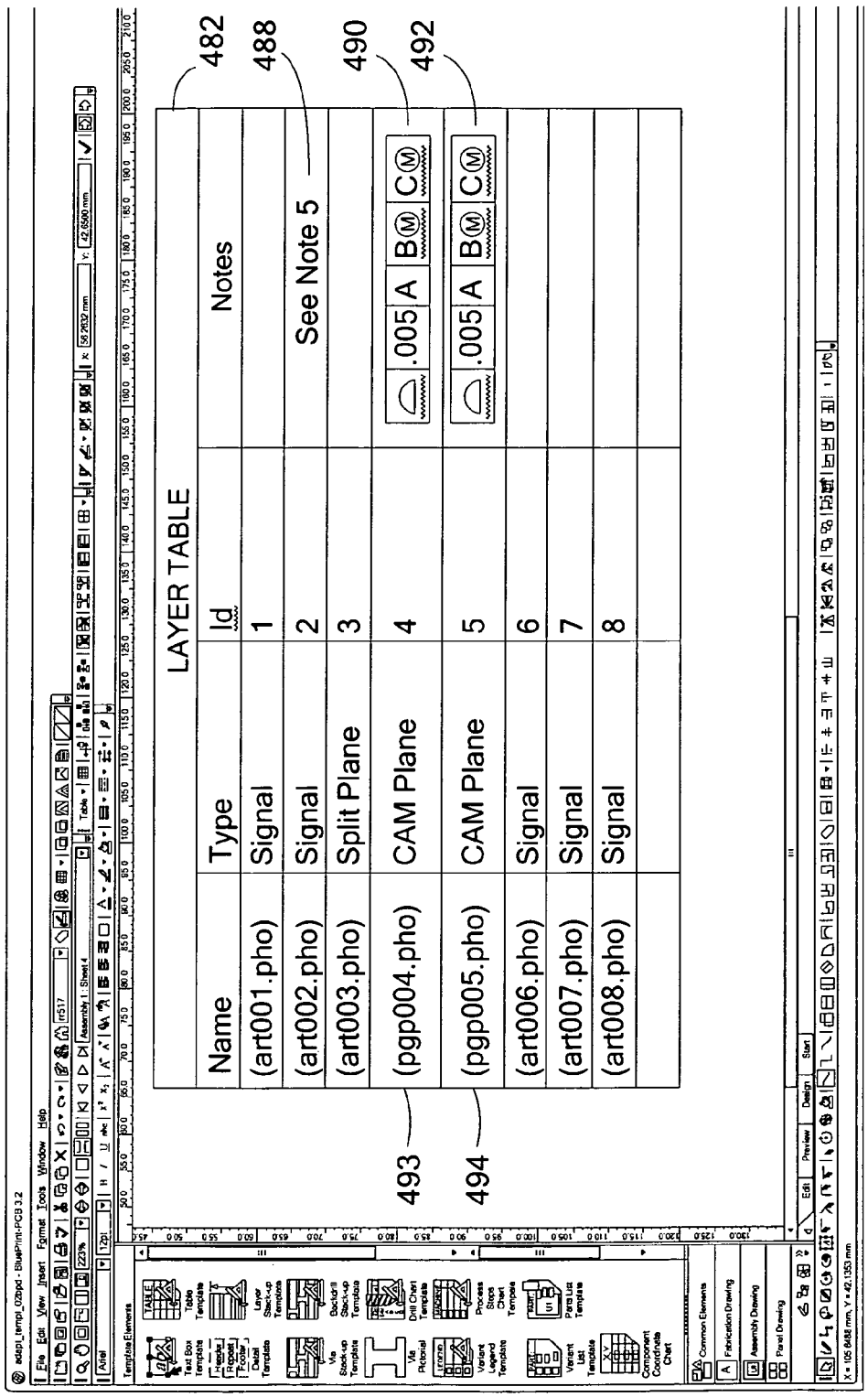
FIG. 33 shows a view of an example of user-entered data in a generic table adaptive template linked to the layers data table as shown in FIG. 31.

Adaptive template system 140 FIG. 1, also preferably includes user-defined table adaptive templates. Preferably, generic table templates are used to link adaptive template system 140 to system data tables and user-defined data tables in data tables 54 in SQL database 126 which is linked to PCB database 12 via database engine 128. System data tables may include layers and nets. User-defined adaptive template tables typically have custom schemas that are defined by a user. In one example, a user-defined data table is populated by importing CSV file 124 via DB import modules 122 into SQL database 126. View 450, FIG. 26, shows and example of generic table template 452 which has been dragged and dropped from the templates command palette item 451. A user can then select a link to the generic table template to layers data table by checking checkbox 454, FIG. 27, in dialog box 456. The primary key, in this example, Layers Number, is chosen to be the composite key for the layers adaptive template by selecting checkbox 458. Similarly, selecting nets checkbox 460, FIG. 28, from dialog box 462 will link the generic table template to nets data table. In this example, the primary key, Nets.Name, is chosen to be the composite key for the adaptive template by selecting checkbox 464. Dialog box 470, FIG. 29, shows an example of a link of a generic table template to a user-defined widgets data table created by selecting checkbox 472. In this example, the primary key, Widgets.ID is chosen to be the composite key for this adaptive template by selecting checkbox 474. FIG. 30 shows an example of a user selecting enable adaptive template checkbox 476 from dialog box 477 and clicking OK button 478 to enable adding and retention of user-entered data to layers table adaptive template 482, FIG. 31. View 484, FIG. 32 shows an example of populated layers adaptive template 482 populated with data. View 486, FIG. 33, shows an example of user-entered data added to populated layers adaptive template 482, indicated at 488, 490, and 492, and an example of a user modifying the height of rows 493 and 494 as shown.

Figure 14:
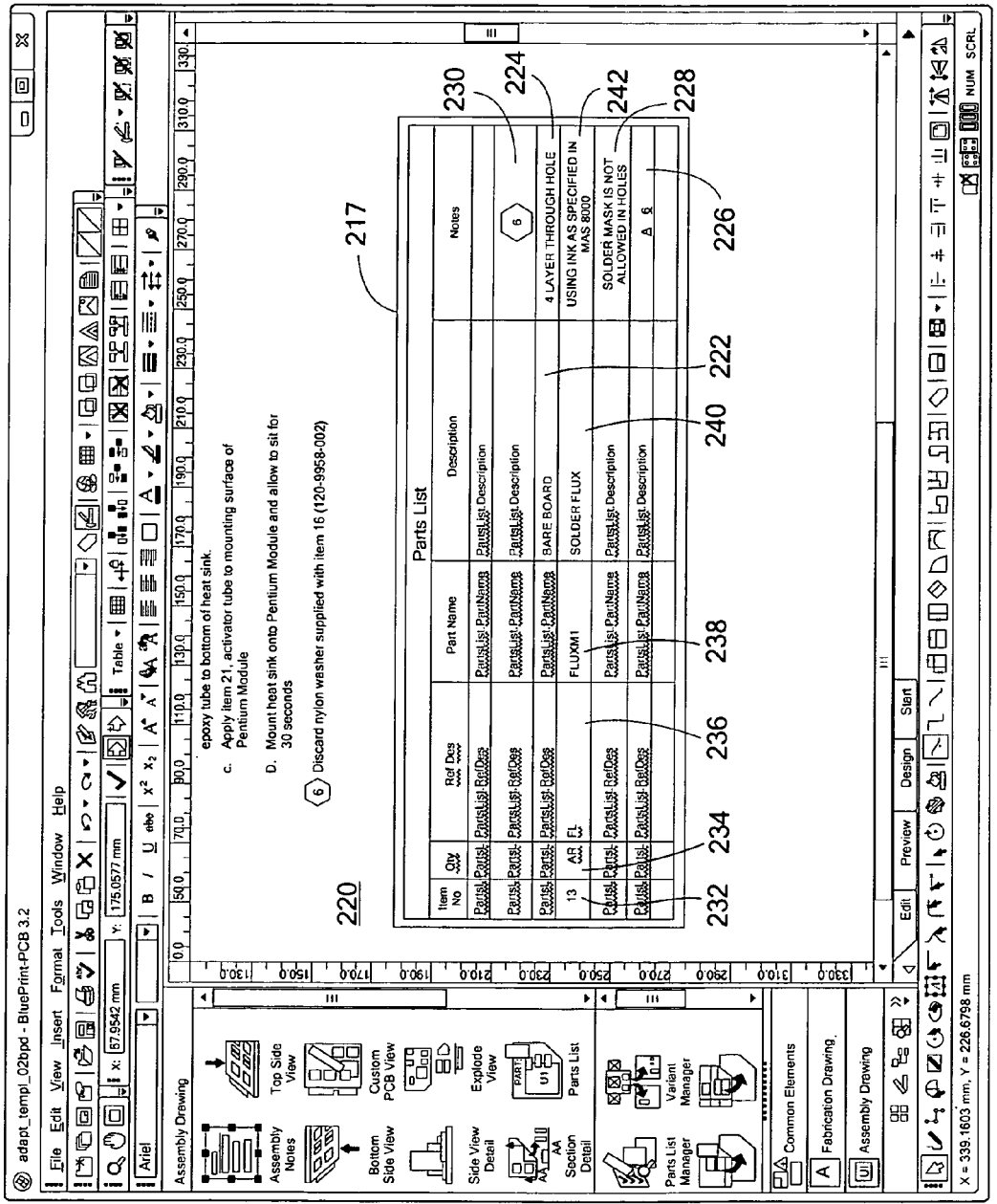
FIG. 14 shows an example of non-populated parts list adaptive template in the edit adaptive template mode which provides for modifying the format of the parts list adaptive template and/or modifying or adding additional user entered-data.
Figure 34:
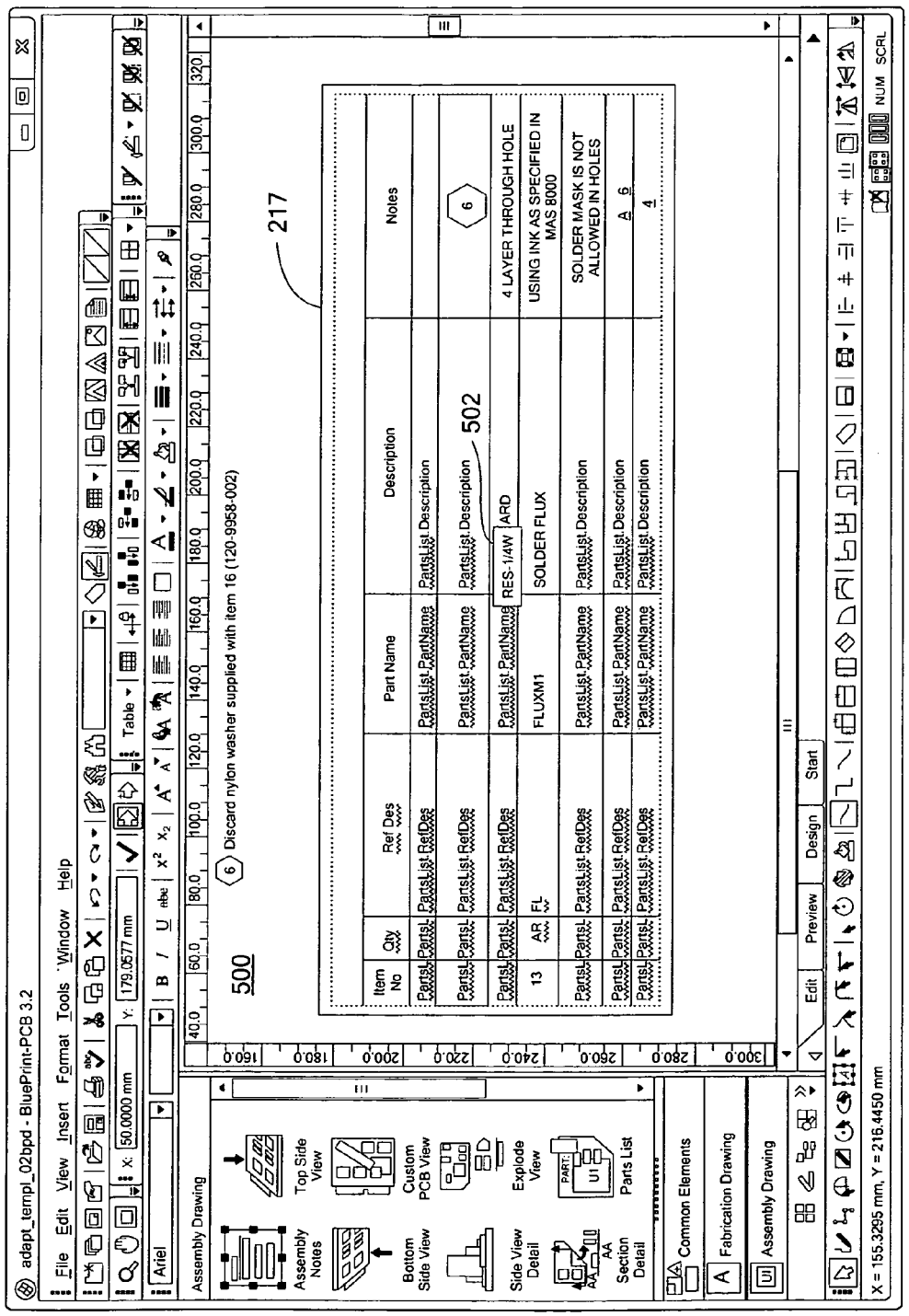
Figure 35:
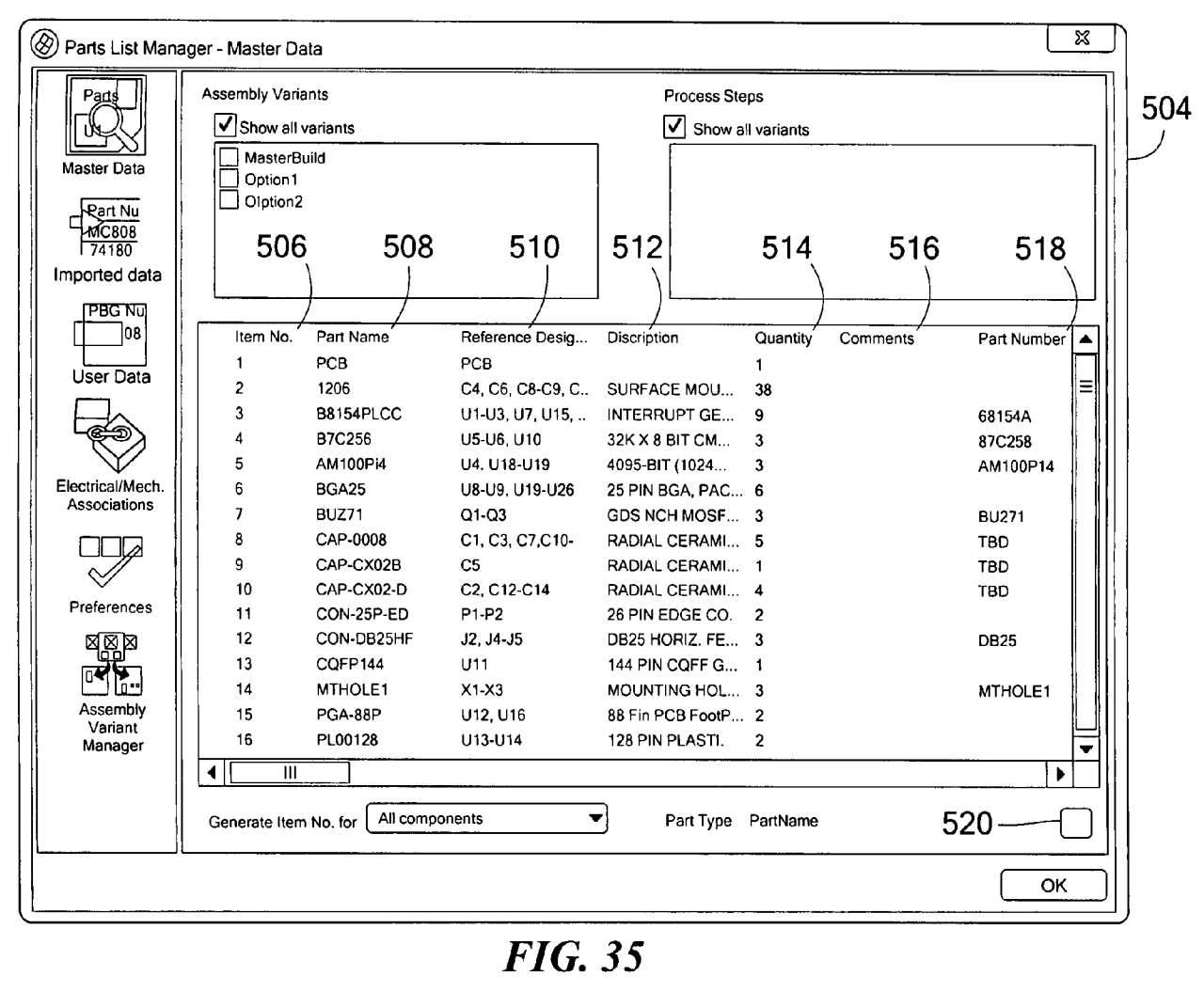
Figure 36:
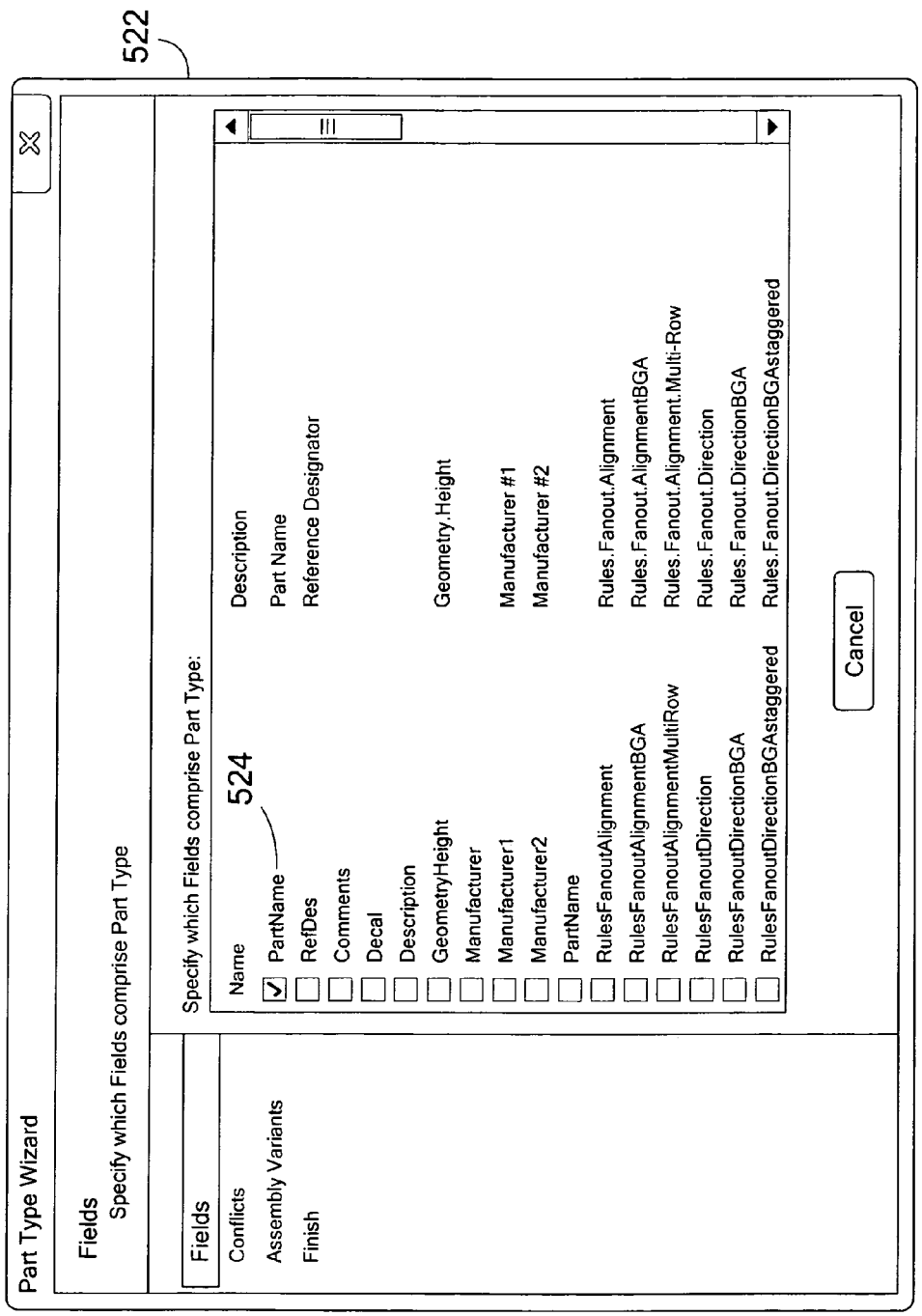

In one embodiment, adaptive template object 150, FIG. 1, is configured to populate the selected adaptive template from adaptive templates 48 and/or adaptive templates 148 with PCB CAD data 14 grouped by a composite key. For example, view 500, FIG. 34, shows an example of parts list adaptive template 217 discussed above with reference to FIG. 12 in edit adaptive template mode with a tool tip 502, FIG. 34, showing the composite key, in this example, part name, RES-1/4W. Dialog box 504, FIG. 35, shows exemplary fields 506, 508, 510, 512, 514, 516, and 518 associated with parts list adaptive template 217 discussed above. Clicking select button 520 generates dialog box 522, FIG. 36. In this example, the user selected part name field 508, FIG. 35, to be the composite key by selecting checkbox 524, FIG. 36. Adaptive template system 140 then populates adaptive parts list template 217 with PCB CAD data 14 enumerated using the composite key part name, e.g., as shown in FIGS. 12 and 14.

Figure 37:
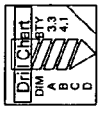
FIG. 37 shows an example of a composite key for a drill chart adaptive template in accordance with one embodiment of this invention.

Dialog box 526, FIG. 37 shows another example of a composite key used by adaptive template system 140 to create, in this example, a composite key for drill chart adaptive template 171, discussed above with reference to one or more of FIGS. 7-12. In this example, the user has selected create a composite key for drill chart adaptive template 171 composed of fields Diameter, Plating, Slot Length, Start Layer and End Layer by selecting checkboxes 526, 528, 530, 532, and 534.

Figure 38:
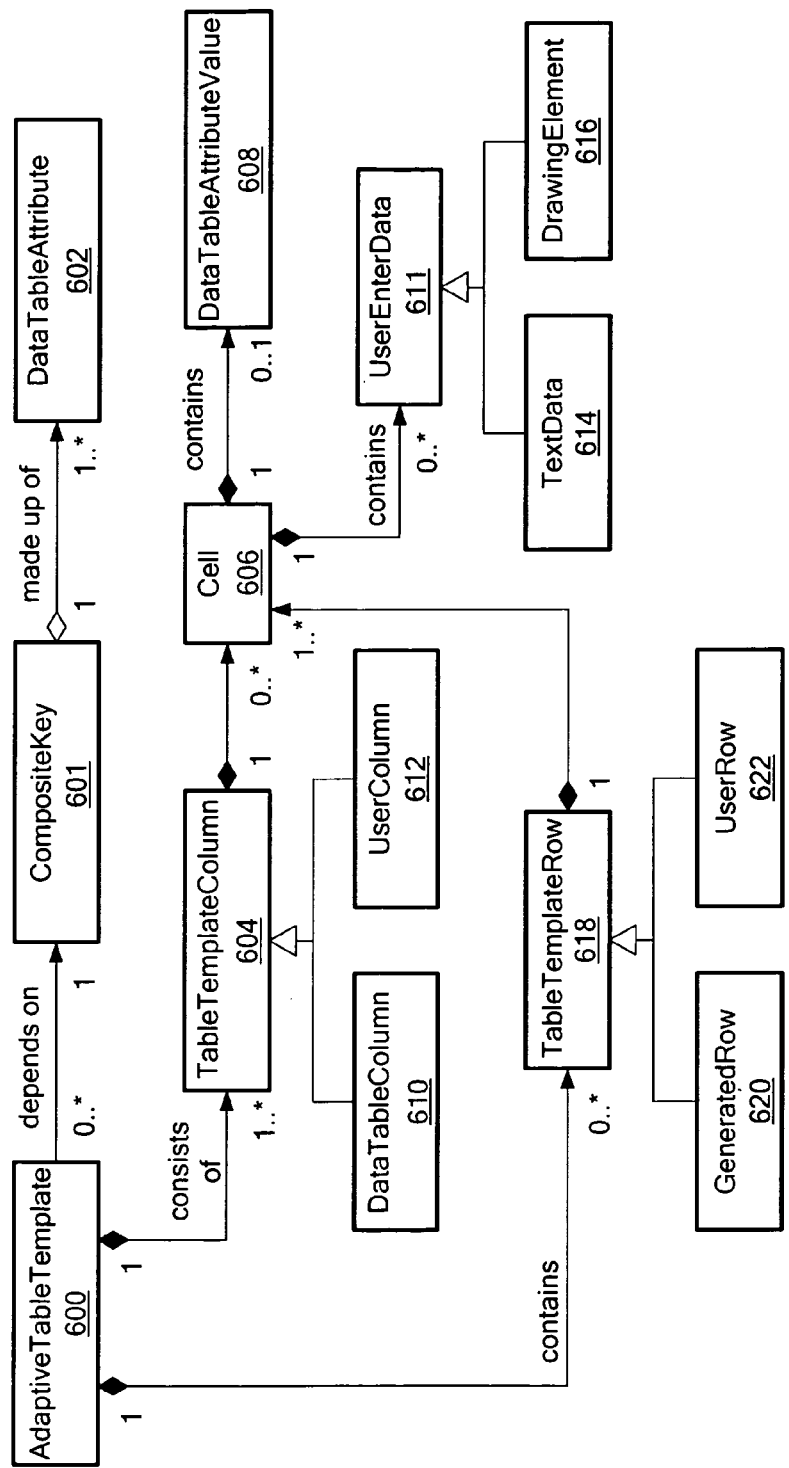
FIG. 38 shows an example of a UML Class diagram for an adaptive template in accordance with one embodiment of this invention.

FIG. 38 shows one example of an adaptive template UML Class diagram. In this example, adaptive template object 600 depends on composite key 601 which is composed of data table attribute 602. Adaptive template object 600 consists of one or many table template column objects 604 and table template row objects 618. Table template column objects 604 can be of one of two types: data table column 610 or user column 612. Table template row objects 618 can be either generated row object 620 or user row object 622. Table template column objects 604 and row objects 618 are comprised of cell objects 606. Cell object 606 may contain user-entered data 611 or data table attribute value 608. User-entered data 611 can be either text data 614 or drawing element 616. The UML (Unified Modeling Language) is defined in *OMG Unified Modeling Language* (OMG UML), *Infrastructure, Version* 2.4.1, Document Number: formal/2011-08-05, Object Management Group, Inc., 2011.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rational underlying the amendment may bear no more than a tangential relation to many equivalents, and/or there are many other reasons the applicant cannot be expected to describe certain insubstantial substitutes for any claim element amended.

What is claimed is:

1. An adaptive template system for an automated PCB manufacturing release package system comprising:
   a PCB database including PCB CAD data associated with a CAD file of PCB design;
   a shape engine configured to read the PCB CAD data and display simultaneous views of a given PCB from the PCB database including different views of the PCB and configured to create reconfigurable objects displayed simultaneously in the form of different views of the PCB such that any change in the design of the PCB is reflected in the different views;
   one or more stored selectable adaptive templates; and
   an adaptive template object in the shape engine configured to: read a selected stored selectable adaptive template, generate a view of the one or more stored selectable adaptive templates which provides for input of user-entered data, and retain the user-entered data in the adaptive template.

2. The system of claim 1 in which the adaptive template object is further configured such that any change in the design of a PCB is reflected in a view of the adaptive template with the user-entered data and a manufacturing documentation release package.

3. The system of claim 1 in which the one or more selectable adaptive templates includes a drill chart adaptive template.

4. The system of claim 1 in which the one or more selectable adaptive templates includes a parts list adaptive template.

5. The system of claim 1 in which the one or more selectable adaptive templates includes a component coordinate chart adaptive template.

6. The system of claim 1 in which the one or more selectable adaptive templates includes a generic table template linked to a data table in the PCB database.

7. The system of claim 6 in which the one or more adaptive templates includes a user-defined table adaptive template.

8. The system of claim 6 in which the one or more adaptive templates includes a layer table adaptive template.

9. The system of claim 6 in which the one or more adaptive templates includes a nets table adaptive template.

10. The system of claim 1 in which the one or more adaptive templates includes a process step chart adaptive template.

11. The system of claim 1 in which the user-entered data includes adding or modifying text in the one or more adaptive templates.

12. The system of claim 1 in which the user-entered data includes adding or modifying a drawing element in the one or more of adaptive templates.

13. The system of claim 1 in which the user-entered data includes inserting or modifying references to the notes, parts list items, document variables and/or details in the one or more of adaptive templates.

14. The system of claim 1 in which the user-entered data includes adding a row in the one or more adaptive templates.

15. The system of claim 14 in which the row is added to the top of a table.

16. The system of claim 14 in which row is added to the bottom of a table.

17. The system of claim 14 in which the row is added to the middle of a table.

18. The system of claim 17 in which the composite key includes a set of user selectable common attributes.

19. The system of claim 14 in which the user-entered data includes resizing the height of a row.

20. The system of claim 14 in which the user-entered data includes deleting one or more rows from in the one or more adaptive templates.

21. The system of claim 1 in which the adaptive template object is further configured to populate the selected adaptive template with PCB data enumerated using a composite key.

22. An adaptive template for an automated PCB manufacturing release package system comprising:
  a PCB database including PCB CAD data associated with a CAD file of PCB design;
  a shape engine configured to read the PCB CAD data and display simultaneous views of a given PCB from the PCB database including different views of the PCB and configured to create reconfigurable objects displayed simultaneously in the form of different views of the PCB such that any change in the design of the PCB is reflected in the different views;
  a drawing elements gallery including one or more stored selectable adaptive templates; and
  an adaptive template object in the shape engine, the adaptive template object configured to: read a selected stored selectable adaptive template, generate a view of the one or more stored selectable adaptive templates which provides for input of user-entered data, and retain the user-entered data in the adaptive template such that any change in the design of a PCB is reflected in a view of the adaptive template with retained user-entered data.

* * * * *